(12) United States Patent
Otani et al.

(10) Patent No.: US 8,870,388 B2
(45) Date of Patent: *Oct. 28, 2014

(54) OPTICAL PROJECTION SYSTEM AND PROJECTOR INCLUDING THE SAME

(75) Inventors: Makoto Otani, Matsumoto (JP); Eiji Morikuni, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,540

(22) Filed: Jul. 20, 2012

(65) Prior Publication Data
US 2013/0027676 A1 Jan. 31, 2013

(30) Foreign Application Priority Data
Jul. 27, 2011 (JP) ................................. 2011-164025

(51) Int. Cl.
*G03B 21/14* (2006.01)
*G02B 13/12* (2006.01)

(52) U.S. Cl.
CPC .............. *G02B 13/12* (2013.01); *G03B 21/142* (2013.01)
USPC ......................................................... 353/88

(58) Field of Classification Search
USPC ........... 353/30, 37, 38, 77, 78, 88, 94, 97, 98, 353/99; 359/364, 365, 366, 433, 716, 728, 359/355, 648, 656, 726, 730; 348/743–747, 348/602, E9.027
See application file for complete search history.

(56) References Cited

U.S. PATENT DOCUMENTS

| | | | |
|---|---|---|---|
| 4,596,447 A | 6/1986 | Yamada et al. | |
| 5,285,268 A * | 2/1994 | Nakagaki et al. | 348/760 |
| 5,671,993 A * | 9/1997 | Shikama | 353/77 |
| 6,575,580 B2 * | 6/2003 | Okamori et al. | 353/98 |
| 6,829,111 B2 * | 12/2004 | Fujisawa et al. | 359/822 |
| 7,095,563 B2 | 8/2006 | Nurishi | |
| 7,113,344 B2 | 9/2006 | Nurishi et al. | |
| 7,580,601 B2 | 8/2009 | Katsuma et al. | |
| 8,482,851 B2 * | 7/2013 | Nagatoshi | 359/364 |
| 2005/0168829 A1 | 8/2005 | Nurishi et al. | |
| 2007/0253076 A1 * | 11/2007 | Takaura et al. | 359/780 |
| 2009/0303607 A1 | 12/2009 | Inoue et al. | |
| 2009/0303608 A1 | 12/2009 | Schauss | |
| 2011/0007387 A1 * | 1/2011 | Epple | 359/351 |

(Continued)

FOREIGN PATENT DOCUMENTS

| | | |
|---|---|---|
| CN | 102866483 A | 1/2013 |
| JP | A-58-108510 | 6/1983 |

(Continued)

*Primary Examiner* — Sultan Chowdhury
(74) *Attorney, Agent, or Firm* — Oliff PLC

(57) ABSTRACT

A light modulation device side lens group has different power in the longitudinal and lateral directions and different magnifications in the longitudinal and lateral directions. Therefore, it is possible to make the aspect ratio of an image of the liquid crystal panel different from the aspect ratio of an image projected on a screen. That is, conversion can be performed on an aspect ratio which is a ratio of width to height using the optical projection system. At this time, a distance p and a distance p' between a diaphragm and the screen SC side end surface of the light modulation device side lens group satisfies predetermined conditional expressions, so it is possible to achieve a predetermined or higher telecentricity in both states, that is, a first operating state and a second operating state.

20 Claims, 17 Drawing Sheets

(56) References Cited

U.S. PATENT DOCUMENTS

| | | |
|---|---|---|
| 2011/0115946 A1 | 5/2011 | Saruwatari |
| 2011/0235167 A1* | 9/2011 | Shafer et al. .................. 359/365 |
| 2012/0320347 A1 | 12/2012 | Morikuni et al. |
| 2012/0327372 A1 | 12/2012 | Otani et al. |
| 2013/0010371 A1 | 1/2013 | Otani et al. |
| 2013/0027676 A1 | 1/2013 | Otani et al. |
| 2013/0229633 A1 | 9/2013 | Hirata et al. |

FOREIGN PATENT DOCUMENTS

| | | |
|---|---|---|
| JP | A-6-43362 | 2/1994 |
| JP | A-2002-118053 | 4/2002 |
| JP | A-2003-098432 | 4/2003 |
| JP | A-2005-221597 | 8/2005 |
| JP | A-2005-300928 | 10/2005 |
| JP | A-2008-511018 | 4/2008 |
| JP | A-2011-107312 | 6/2011 |
| WO | WO 2006/023276 A1 | 3/2006 |

\* cited by examiner

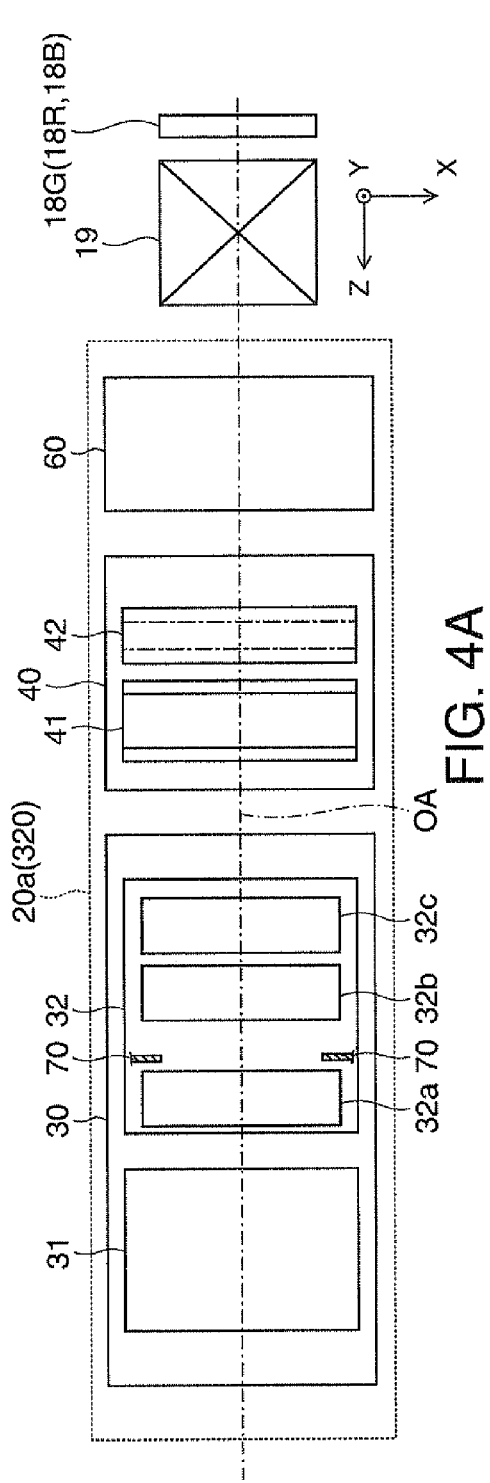
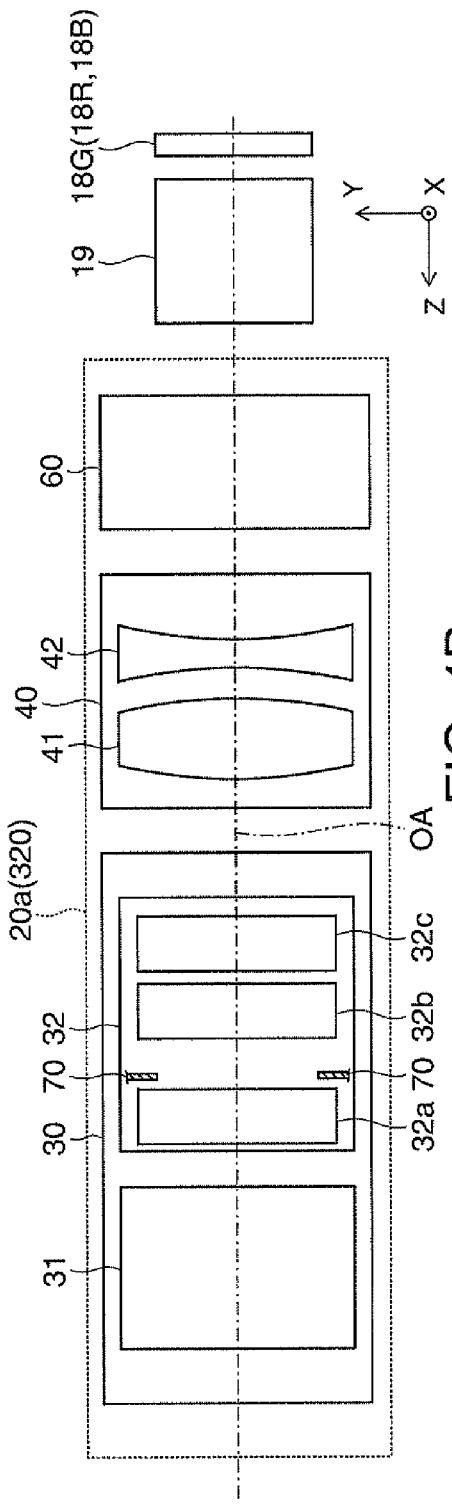
FIG. 4A
FIG. 4B

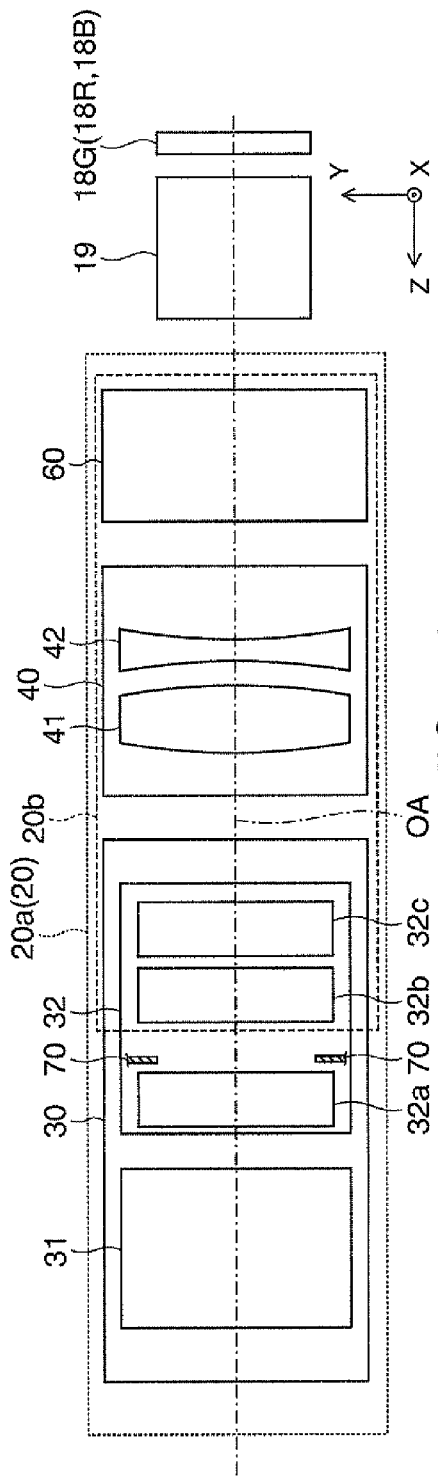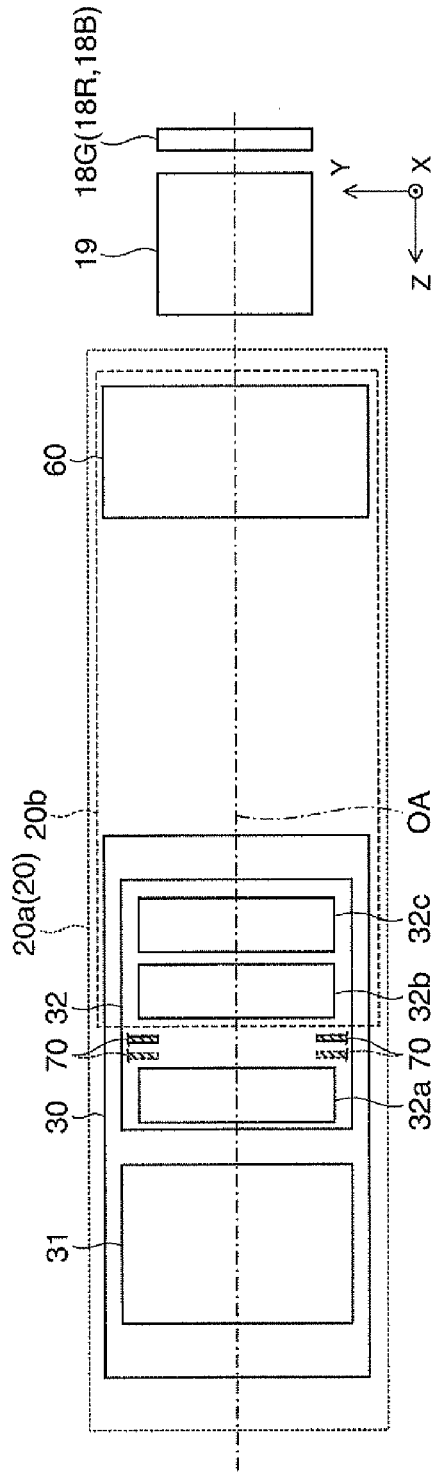

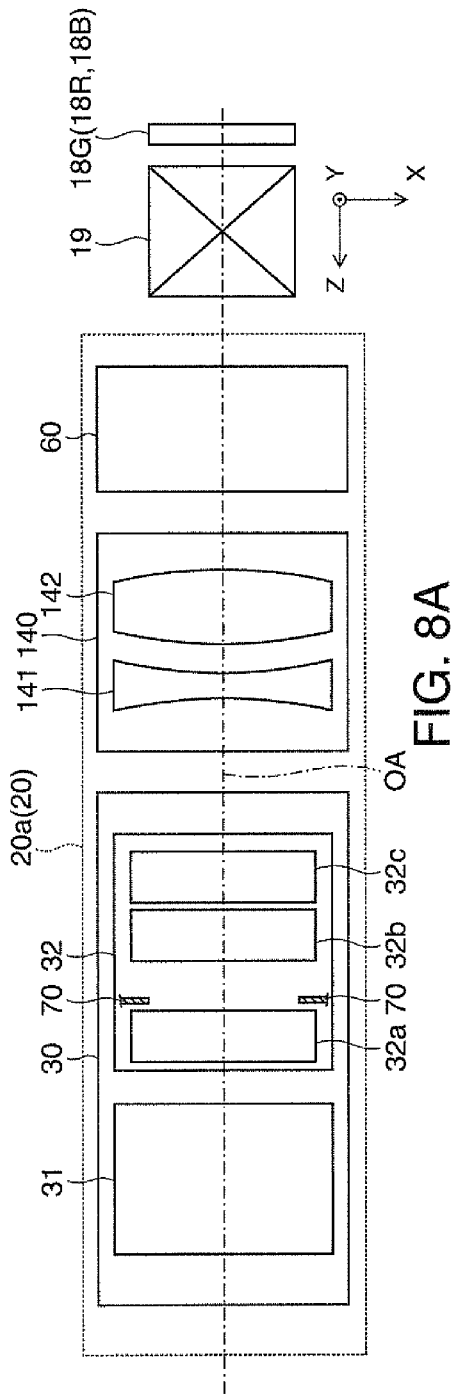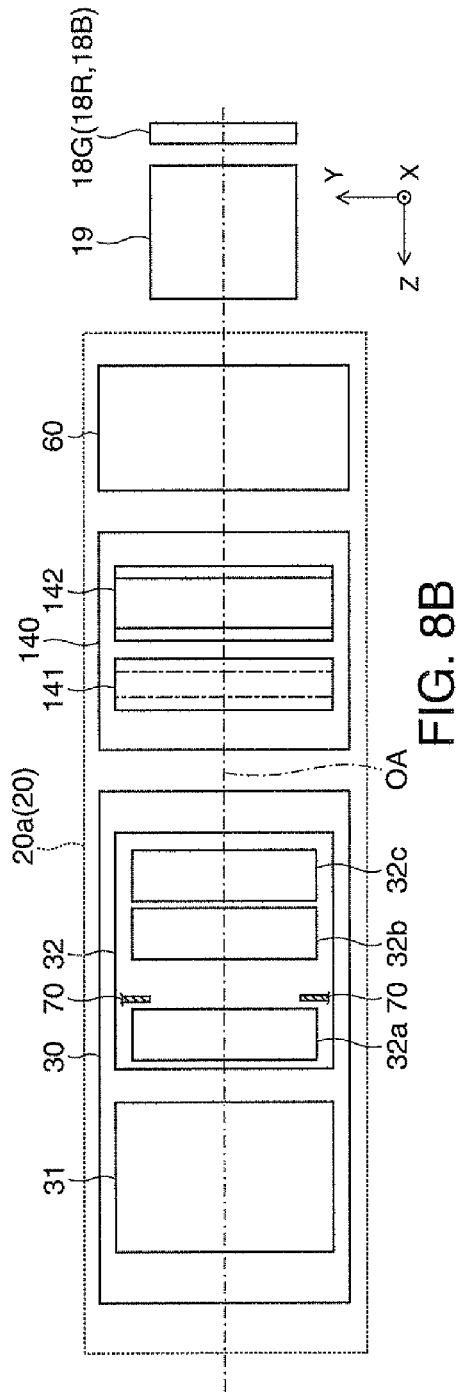

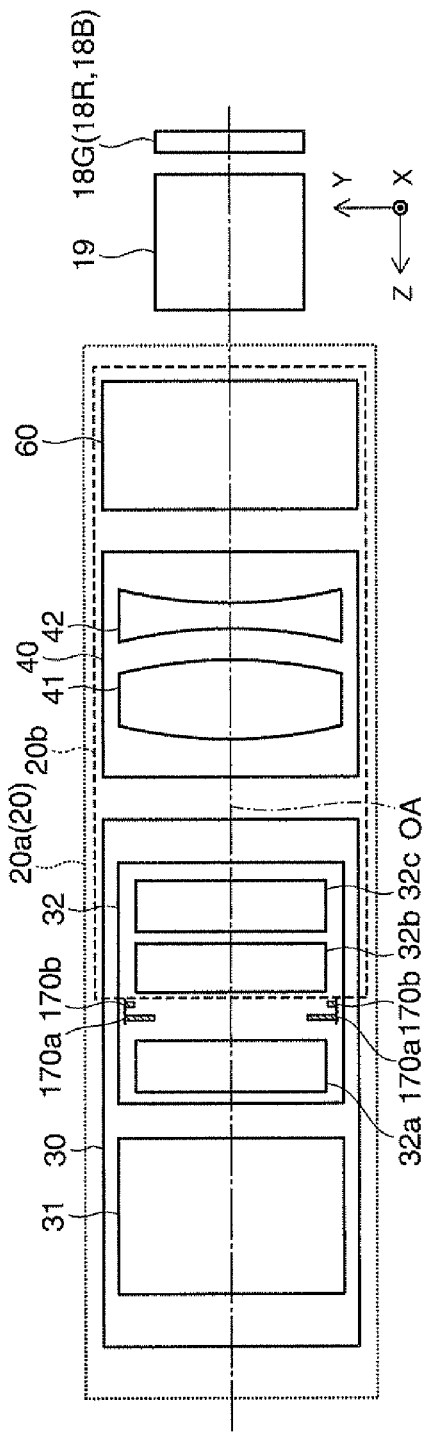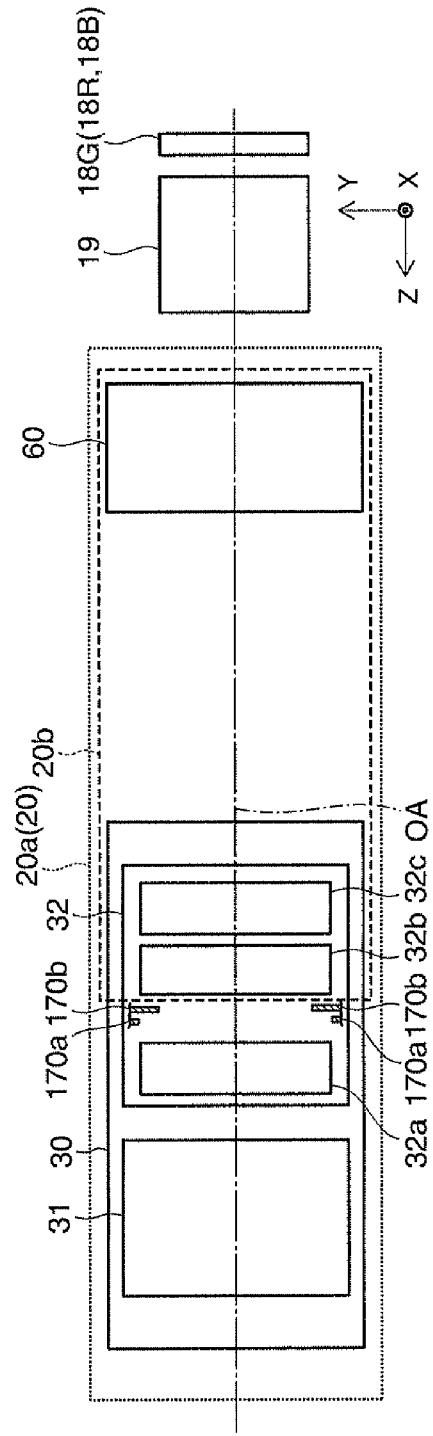

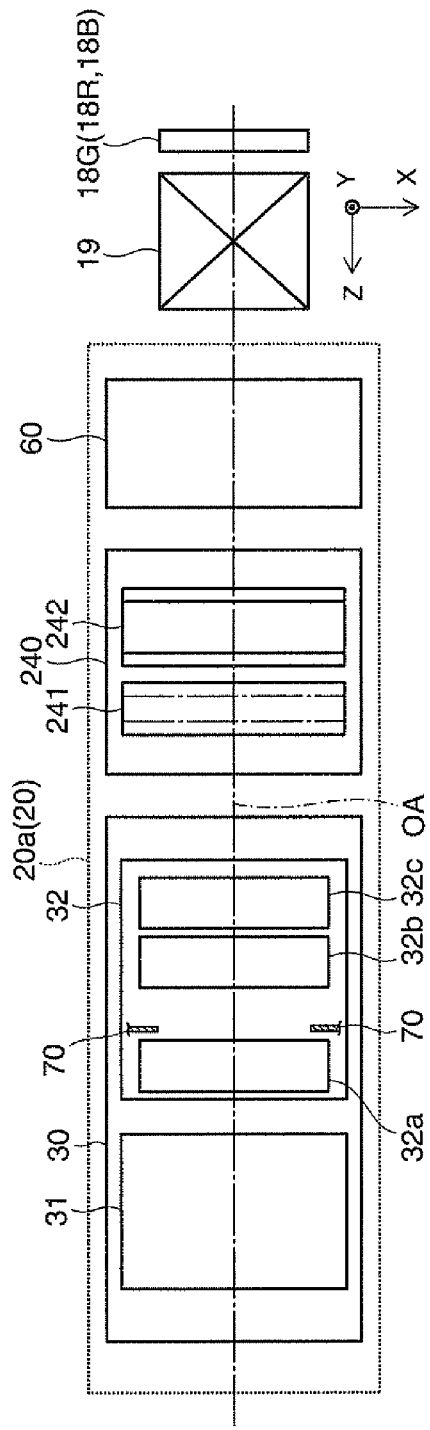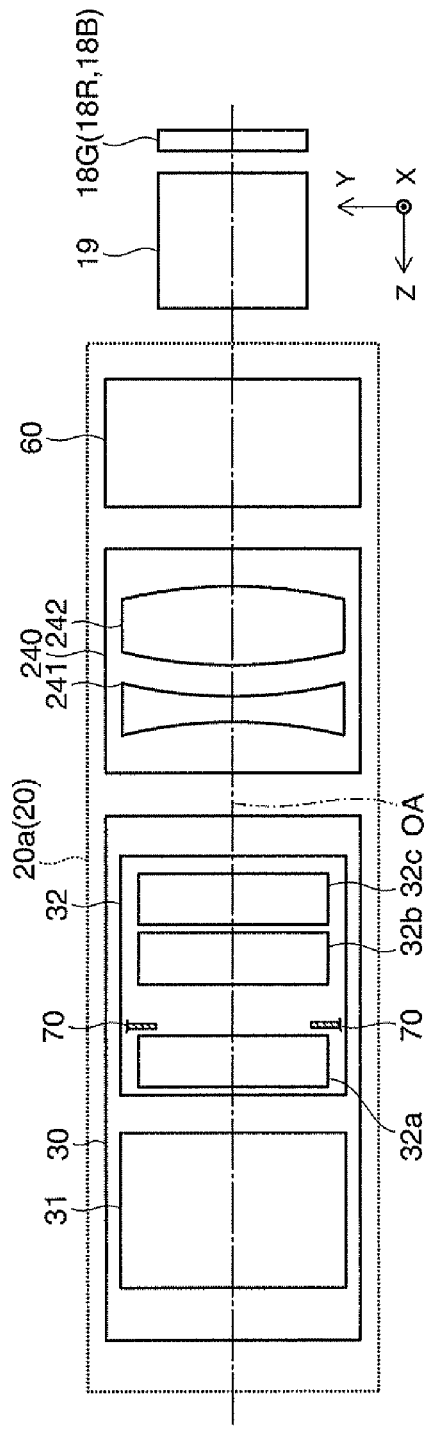

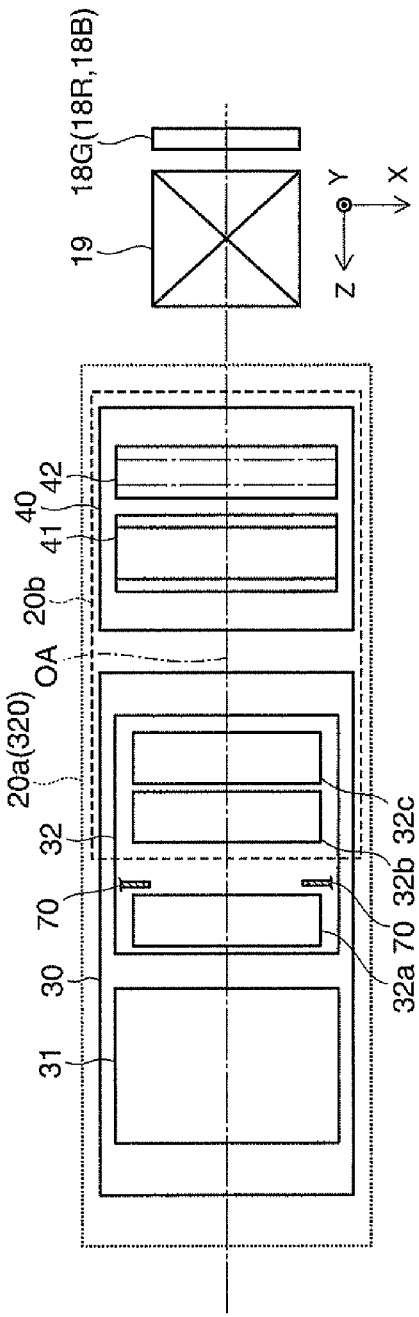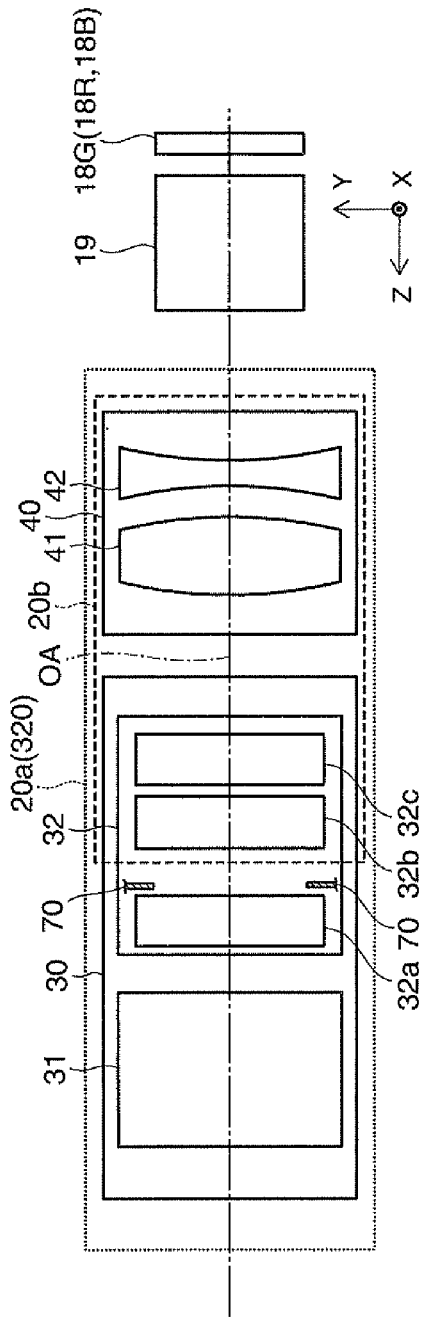
FIG. 17A
FIG. 17B

OPTICAL PROJECTION SYSTEM AND PROJECTOR INCLUDING THE SAME

BACKGROUND

1. Technical Field

The present invention relates to an optical projection system, which can perform conversion on an aspect ratio of a projected image, and a projector including the same.

2. Related Art

As a converter for aspect ratio conversion, which is used in the optical projection system of a projector, there is a front arrangement-type converter which is arranged to be able to advance and retract in the front of an optical projection system in the related art, that is, in the front of an image side.

However, this type of converter is provided as an external optical unit which is independent from the projector main body, causes an increase in the size of the projector, complicates the adjustment of the whole optical projection system including the converter, or badly degrades an image.

In addition, instead of the optical projection system of the projector, as a converter for aspect ratio conversion used in an imaging optical system, such as a camera, there is a rear arrangement-type relay system which is attachably and detachably arranged in the image side of an image forming optical system (refer to JP-A-2005-221597 and JP-A-2005-300928). This relay system includes a first group, a second group, and a third group. Among them, the intermediate second group is an anamorphic converter, and can be inserted into or retracted from between the first group and the third group.

However, the relay system or the anamorphic converter disclosed in JP-A-2005-221597 or the like is used in an imaging optical system. If the relay system or the anamorphic converter is used in an optical projection system as it is, various types of restrictions occur.

For example, in the case of the above-described rear arrangement-type relay system, the telecentricity is not considered. In such a relay system, in principle, it is difficult to achieve both the telecentricity of a lateral section and the telecentricity of a longitudinal section. Therefore, if the telecentricity is precisely secured in one direction of an X section and a Y section, the telecentricity is greatly degraded in the remaining direction, so that the usage efficiency of light deteriorates or is biased according to the direction.

Further, in the imaging optical system disclosed in JP-A-2005-221597, it is fundamentally assumed that lenses can be replaced. When a rear arrangement-type relay system is not used, an image forming optical system is directly fixed to an imaging unit and independently used. Therefore, in the case of maintaining the performance of the image forming optical system, there is a problem in that the length of the rear arrangement-type relay system becomes long. Meanwhile, lenses are not generally replaced in an optical projection system, so that a function as a general-purpose relay system or a general-purpose converter, in which various types of interchangeable lenses can be mounted, is not necessary.

SUMMARY

An advantage of some aspects of the invention is to provide an optical projection system, which increases the usage efficiency of light in a balanced manner, and a projector including the optical projection system.

One aspect of the invention is directed to an optical projection system which, when an image is enlarged and projected on a surface to be projected, makes an aspect ratio of an image of a light modulation device different from an aspect ratio of the image projected on the surface to be projected, the optical projection system including a diaphragm which restricts the passage of light flux; and a light modulation device side lens group which is arranged between the light modulation device and the diaphragm, configured to have different power in a longitudinal direction and the lateral direction of the light modulation device, and configured to include an adjustment optical device capable of advancing and retracting on an optical path. The diaphragm restricts the passage of the light flux in different positions in an optical axis direction in association with an operation of advancing and retracting the adjustment optical device of the light modulation device side lens group.

According to the above-described optical projection system, the adjustment optical device of the light modulation device side lens group can be advanced and retracted on the optical path. Therefore, in a first operating state in which the adjustment optical device is arranged on the optical path, and conversion is performed on the aspect ratio and then projection is performed, the light modulation device side lens group has different focal distances in the longitudinal and lateral directions and different magnifications in the longitudinal and lateral directions. Therefore, it is possible to make the aspect ratio of an image of the light modulation device different from the aspect ratio of an image projected on a surface to be projected. That is, using the optical projection system, conversion can be performed on an aspect ratio which is the ratio of width to height. Further, in a second operating state in which the adjustment optical device is withdrawn from the optical path and the aspect ratio is projected without being converted, it is possible to make the aspect ratio of the image of the light modulation device equal to the aspect ratio of the image projected on the surface to be projected. That is, using the optical projection system, the ratio of width to height can be maintained as it is without performing conversion on the ratio of width to height. When changing such a projection state described above, comparatively high telecentricity can be secured in either the first operating state and the second operating state by the diaphragm changing position in association with the operation of advance and retraction of the adjustment optical device.

In a specific aspect of the invention, in the optical projection system, when it is assumed that a distance between the diaphragm and an end surface in a side of the surface to be projected in the light modulation device side lens group is "p", a distance between the focus in the side of the surface to be projected and the end surface in the side of the surface to be projected is FFPx in a lateral section in the light modulation device side lens group, and a distance between the focus in the side of the surface to be projected and the end surface in the side of the surface to be projected in a longitudinal section in the light modulation device side lens group is FFPy, wherein, if FFPx<FFPy, in a state where the adjustment optical device of the light modulation device side lens group is on the optical path, the diaphragm is located at a position where p satisfies following condition.

$$FFPx < p < FFPy \quad (1)$$

If FFPy<FFPx, in a state where the adjustment optical device of the light modulation device side lens group is on the optical path, the diaphragm is located at a position where p satisfies following condition.

$$FFPy < p < FFPx \quad (1)'$$

In this case, the distance p between the diaphragm and the end surface in the side of the surface to be projected in the light modulation device side lens group satisfies the above-described Conditional expressions (1) and (1)' in the first operating state in which the adjustment optical device is arranged on the optical path, and conversion is performed on the aspect ratio and then projection is performed, so that it is possible to secure a predetermined or more telecentricity in both longitudinal direction and lateral direction. For example, if FFPx<p<FFPy, principal rays in the longitudinal direction slopes inward for the surface to be projected and principal rays in the lateral direction slopes outward for the surface to be projected. However, the telecentricity is maintained as a whole. On the contrary, if FFPy<p<FFPx, principal rays in the longitudinal direction slopes outward for the surface to be projected, and principal rays in the lateral direction slopes inward for the surface to be projected. However, the telecentricity is maintained as a whole.

In another aspect of the invention, the distance p between the diaphragm and the end surface in the side of the surface to be projected in the light modulation device side lens group is substantially equal to a distance FFPL between the focus in the side of the surface to be projected in the light modulation device side lens group and the end surface in the side of the surface to be projected in the state in which the adjustment optical device is withdrawn from the optical path. In this case, an appropriate state can be set in order to implement the telecentricity.

In still another aspect of the invention, in the projection optical system, if FFPx<FFPy, in a state where the adjustment optical device of the light modulation device side lens group is on the optical path, p satisfies following condition.

$$FFPx < p \leq (FFPy + FFPx)/2 \quad (2)$$

If FFPy<FFPx, in a state where the adjustment optical device of the light modulation device side lens group is on the optical path, p satisfies following condition.

$$FFPy < p \leq (FFPy + FFPx)/2 \quad (2)'$$

In this case, it is possible to make the telecentricity comparatively high in the intermediate direction between the lateral direction and the longitudinal direction, it is possible to reduce the directional bias of telecentricity, and it is possible to project a bright image in which it is difficult to cause unevenness depending on the direction of observation or the like.

In still another aspect of the invention, in the optical projection system, in order from the side of the surface to be projected, the system substantially includes a first group which performs enlargement; a second group which is the adjustment optical device having different power in the longitudinal direction and the lateral direction of the light modulation device, and capable of advancing and retracting on the optical path; and a third group having positive power. In this case, using the third group having positive power, it is possible to restrain an incidence angle of light incident on the second group, and also to restrain aberration generated in the second group, therefore, it is possible to improve image formation performance. In addition, since it is possible to restrain spread of light by the third group and the diameter of the second group becomes smaller, highly precise lens processing can be expected, so that performance can be improved and costs can be reduced. The second group can be advanced and retracted on a ray at a position which is close to the light modulation device. Therefore, even when the second group is inserted onto a ray, the ray of each image height passes through the second group along a path which is comparatively close to the image height, so that it is easy to control rays.

Therefore, it is possible to restrain the occurrence of aberration because of the operation of advancing and retracting on the optical path of the second group, and it is possible to prevent the deterioration of image formation performance when the second group is inserted onto a ray. That is, by placing the second group, which is capable of advancing and retracting on the ray, on a position which is close to the light modulation device, it is possible to restrain the occurrence of aberration.

In still another aspect of the invention, in the optical projection system, in order from the side of the surface to be projected, the system substantially includes a first group which performs enlargement; and a second group which is the adjustment optical device having different power in the longitudinal direction and the lateral direction of the light modulation device, and capable of advancing and retracting on the optical path. Generally, it is difficult to manufacture a rotationally asymmetric optical device, and miniaturization is necessary in order to achieve accuracy. In the case of the optical projection system, at a position which is close to the light modulation device, the ray is less spread, and the tense is miniaturized. Therefore, it is expected that a highly precise lens processing is performed, the performance is improved and the cost thereof can be reduced.

In still another aspect of the invention, in the optical projection system, the system further includes an advance and retract drive mechanism that makes the second group advance and retract; and a diaphragm drive mechanism that makes the diaphragm operate in association with the advance and retract drive mechanism. In this case, it is possible for the second group to be advanced and retracted using the advance and retract drive mechanism, and for the diaphragm to be arranged at different positions with regard to an optical axis direction in accordance with the advance and retraction of the second group using the diapraghm drive mechanism.

In still another aspect of the invention, in the optical projection system, the diaphragm drive mechanism causes the diaphragm to slide along an optical axis direction in association with the advance and retraction of the second group. In this case, by making the diaphragm slide along the optical axis direction, it is possible for the diaphragm to be arranged at different positions with regard to the optical axis direction.

In still another aspect of the invention, in the optical projection system, a plurality of the diaphragms are arranged at different positions in the optical axis direction, and the diaphragm drive mechanism changes the diameter of the diaphragm in association with the advance and retraction of the second group. In this case, by changing the diameter of the plurality of diaphragms, that is, by changing an opened or closed state of the diaphragm arranged at different positions, it is possible to achieve the same effect as arranging the diaphragm at different positions with regard to the optical axis direction.

In still another aspect of the invention, in the optical projection system, in a section of the light modulation device in a longitudinal direction, in order from the side of the surface to be projected, the second group includes a first optical device group which has positive power and a second optical device group which has negative power. In this case, an image to be projected on the surface to be projected can be compressed or reduced in the longitudinal direction. In the case where a horizontal dimension of the surface to be projected is fixed, it is possible to change the aspect ratio without changing a projection distance.

In still another aspect of the invention, in the optical projection system, in a section of the light modulation device in a lateral direction, in order from the side of the surface to be projected, the second group includes a first optical device group which has negative power and a second optical device group which has positive power. In this case, an image to be projected on the surface to be projected can be expanded or enlarged in the lateral direction. In the case where a longitudinal dimension of the surface to be projected is fixed, it is possible to change the aspect ratio without changing a projection distance.

One aspect of the invention is directed to a projector including the optical projection system and the light modulation device. According to the projector, it is possible to project an image, which has an aspect ratio which is different from an aspect ratio of the image of the light modulation device, on the surface to be projected. At this time, it is possible to project a bright image in which it is difficult to cause unevenness depending on the direction of observation using a particular optical projection system.

BRIEF DESCRIPTION OF THE DRAWINGS

The invention will be described with reference to the accompanying drawings, wherein like numbers reference like elements.

FIG. 4A is a view illustrating the configuration of the lateral section of the optical projection system in the first operating state, and FIG. 4B is a view illustrating the configuration of the longitudinal section of the optical projection system in the first operating state.

FIG. 5A is a view illustrating the first operating state of the optical projection system, and FIG. 5B is a view illustrating the second operating state of the optical projection system.

FIG. 8A is a view illustrating the configuration of a lateral section of the optical projection system shown in FIG. 3 or the like according to a modification example, and FIG. 8B is a view illustrating the configuration of a longitudinal section of the optical projection system.

FIG. 15A is a view illustrating the first operating state of the optical projection system of a projector according to a second embodiment, and FIG. 15B is a view illustrating the second operating state of the optical projection system.

FIG. 16A is a view illustrating the configuration of the lateral section of the optical projection system of a projector according to a third embodiment, and FIG. 16B is a view illustrating the configuration of the longitudinal section of the optical projection system.

FIG. 17A is a view illustrating the configuration of the lateral section of the optical projection system of a projector according to a fourth embodiment, and FIG. 17B is a view illustrating the configuration of the longitudinal section of the optical projection system.

DESCRIPTION OF EXEMPLARY EMBODIMENTS

A projector and an optical projection system according to an embodiment of the invention will be described in detail with reference to the accompanying drawings.

First Embodiment

Figure 1:
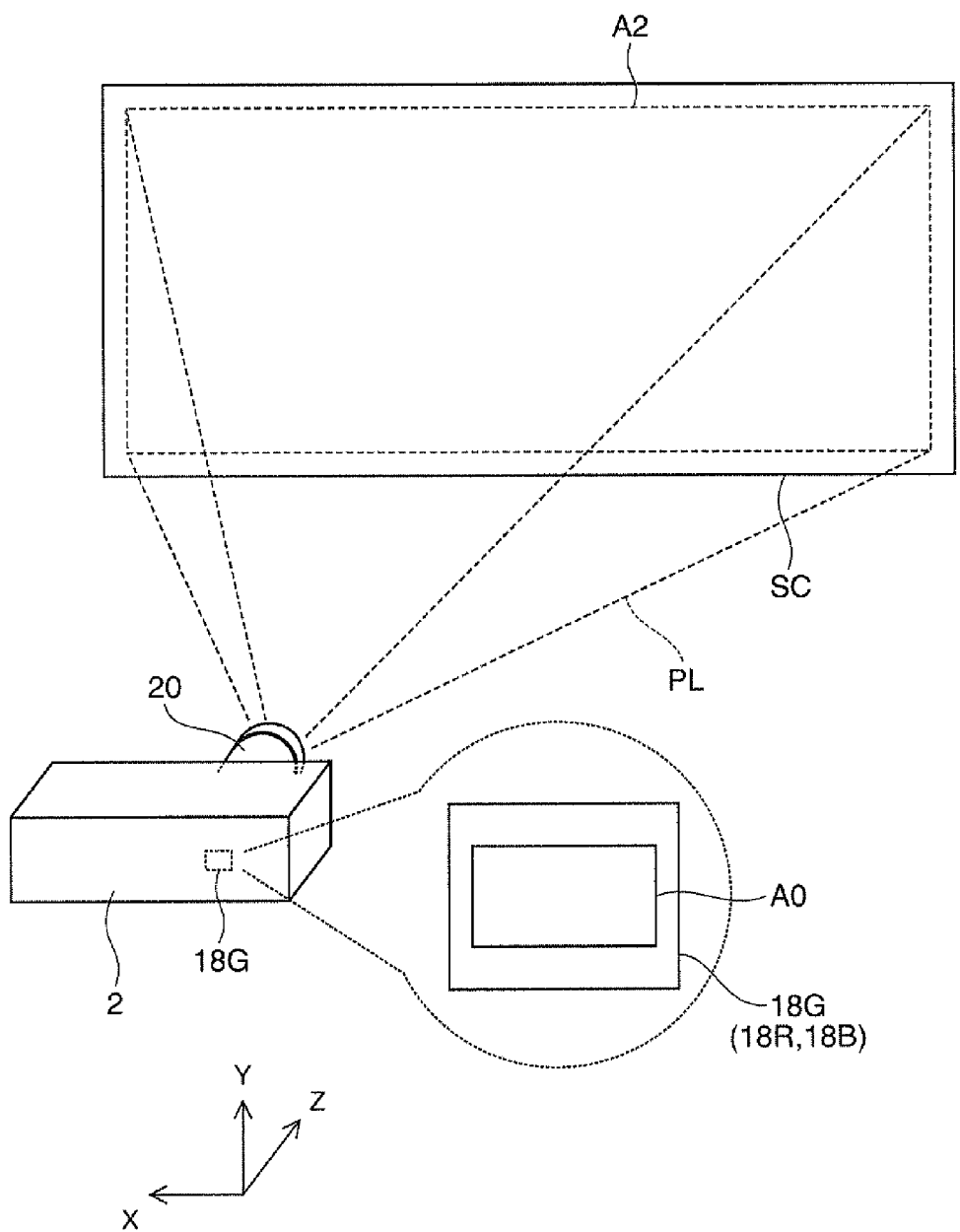
FIG. 1 is a perspective view illustrating the usage state of a projector according to a first embodiment.

As shown in FIG. 1, a projector 2 according to a first embodiment of the invention forms image light PL in response to an image signal, and projects the corresponding image light PL on a surface to be projected, such as a screen SC. When the image of a liquid crystal panel 18G (18R, 18B), which is a light modulation device embedded in the projector 2, is enlarged and then projected on the screen (the surface to be projected) SC, the optical projection system 20 of the projector 2 can make the aspect ratio AR0 of the image of the liquid crystal panel 18G (18R, 18B) different from the aspect ratio AR2 of an image to be projected on the screen SC. That is, although the aspect ratio AR0 of the display region A0 of the liquid crystal panel 18G can be different from the aspect ratio AR2 of the display region A2 of the screen SC, the aspect ratio AR0 of the display region A0 of the liquid crystal panel 18G can be equal to the aspect ratio AR2 of the display region A2 of the screen SC. In particular, the aspect ratio AR0 of the display region A0 of the liquid crystal panel 18G is, for example, 1.78:1, and the aspect ratio AR2 of the display region A2 of the screen SC is, for example, 1.78:1, 1.85:1, 2.35:1, 2.4:1, or the like.

Figure 2:
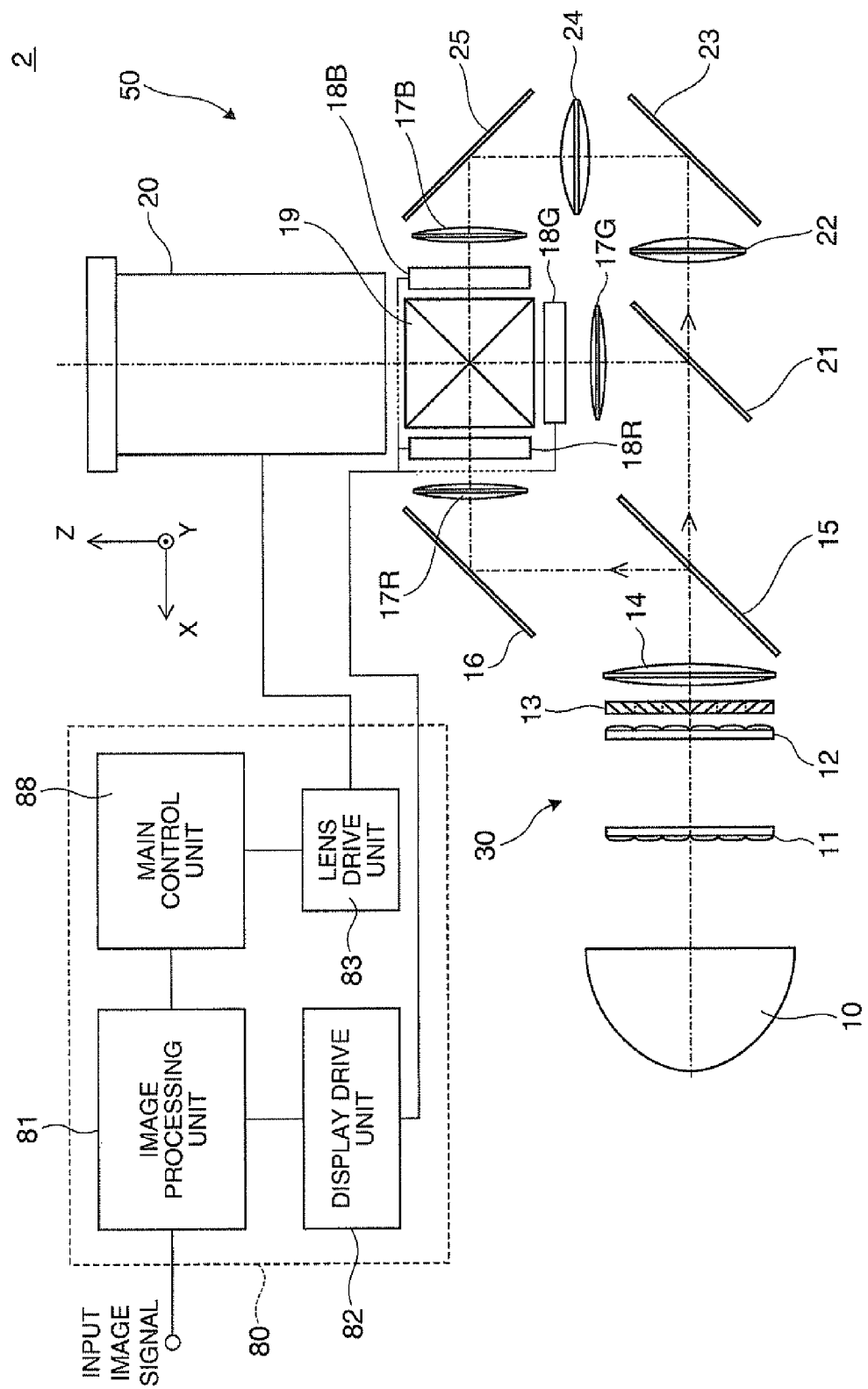
FIG. 2 is a view illustrating the schematic configuration of the projector shown in FIG. 1.

As shown in FIG. 2, the projector 2 includes an optical system portion 50 which projects image light and a circuit apparatus 80 which controls the operation of the optical system portion 50.

The light source 10 of the optical system portion 50 is, for example, an extra high pressure mercury lamp, and emits light including R light, G light, and B light. Here, the light source 10 may be a discharge light source other than the extra high pressure mercury lamp, and may be a solid light source, such as an LED or laser. Each of a first integrator lens 11 and a second integrator lens 12 includes a plurality of lens devices which are arranged in an array. The first integrator lens 11 divides light flux received from the light source 10 into a plurality of pieces of light flux. Each of the lens devices of the first integrator lens 11 performs light condensing on the light flux received from the light source 10 in the vicinity of the lens devices of the second integrator lens 12. The lens devices of the second integrator lens 12 form the image of the lens devices of the first integrator lens 11 on the liquid crystal panels 18R, 18G, and 18B in cooperation with a superimposed lens 14. With the above-described configuration, the light from the light source 10 illuminates the whole display region (display region A0 in FIG. 1) of the liquid crystal panels 18R, 18G, and 18B with substantially uniform brightness.

A polarized conversion device 13 converts light from the second integrator lens 12 into predetermined linear polarized light. The superimposed lens 14 superimposes the images of the respective lens devices of the first integrator lens 11 on the display regions of the liquid crystal panels 18R, 18G, and 18B via the second integrator lens 12.

A first dichroic mirror 15 reflects the R light which is incident from the superimposed lens 14, and passes the G light and the B light. The R light reflected by the first dichroic mirror 15 is incident on the liquid crystal panel 18R, which is the light modulation device, via a reflection mirror 16 and a field lens 17R. The liquid crystal panel 18R forms an R-color image by modulating the R light in response to the image signal.

A second dichroic mirror 21 reflects the G light received from the first dichroic mirror 15, and passes the B light. The G light reflected by the second dichroic mirror 21 is incident on the liquid crystal panel 18G, which is the light modulation device, via a field lens 17G. The liquid crystal panel 18G forms a G-color image by modulating G light in response to the image signal. The B light, which passed through the second dichroic mirror 21, is incident on the liquid crystal panel 18B, which is the light modulation device, via relay lenses 22 and 24, reflection mirrors 23 and 25, and a field lens 17B. The liquid crystal panel 18B forms a B-color image by modulating the B light in response to the image signal.

A cross dichroic prism 19 is a prism for photosynthesis. The cross dichroic prism 19 synthesizes pieces of light modulated in the respective liquid crystal panels 18R, 18G, and 18B, makes the resulting light as image light, and then progresses the resulting light to the optical projection system 20.

The optical projection system 20 enlarges and projects the image light PL, which is modulated by the liquid crystal panels 18G, 18R, and 18B and then synthesized by the cross dichroic prism 19, on the screen SC in FIG. 1. At this time, the optical projection system 20 can make the aspect ratio AR2 of the image projected on the screen SC different from the aspect ratio AR0 of the image of the liquid crystal panels 18G, 18R, and 18B, or can make the aspect ratio AR2 equal to the aspect ratio AR0.

The circuit apparatus 80 includes an image processing unit 81 to which an external image signal, such as a video signal, is input, a display drive unit 82 which drives the liquid crystal panels 18G, 18R, and 18B provided in the optical system portion 50 based on the output of the image processing unit 81, a lens drive unit 83 which adjusts the state of the optical projection system 20 by operating drive mechanism (not shown) provided in the optical projection system 20, and a main control unit 88 which generally controls the operation of the circuit units 81, 82, 83, and the like.

The image processing unit 81 converts the input external image signal into an image signal including the grayscale or the like of each color. In the case of a first operating state in which the optical projection system 20 performs conversion on the aspect ratio of an image and then projects the image, the image processing unit 81 performs conversion in advance on the aspect ratio of an image, obtained by reversing the conversion on the aspect ratio performed by the optical projection system 20, thereby preventing the image displayed on the screen SC from being expanded and contracted in the longitudinal and lateral directions. In particular, when an image is expanded by the optical projection system 20 in the lateral direction to be in the range, for example, from 1.78:1 to 2.4:1, the image is compressed in advance in the lateral direction by 0.742=1.78/2.4 times or the image is expanded in the longitudinal direction by 1.35=2.4/1.78 times. Meanwhile, in the case of a second operating state in which the optical projection system 20 does not perform conversion on the aspect ratio of the image and projects the image, the image processing unit 81 does not perform conversion on the aspect ratio of the image as described above. In addition, the image processing unit 81 can perform various types of image processes, such as distortion correction or color correction, on the external image signal.

The display drive unit 82 can operate the liquid crystal panels 18G, 18R, and 18B based on the image signal output from the image processing unit 81, and can form an image corresponding to the relevant image signal or an image corresponding to a signal, obtained by performing an image process on the image signal, on the liquid crystal panels 18G, 18R, and 18B.

The lens drive unit 83 operates under the control of the main control unit 88, and can change the projection magnification of the image on the screen SC in FIG. 1 using the optical projection system 20 by, for example, appropriately moving a partial optical device including a diaphragm included in the optical projection system 20 along the optical axis OA. Further, the lens drive unit 83 can change the aspect ratio AR2 of the image which is projected on the screen SC in FIG. 1 by advancing and retracting additional partial optical device, included in the optical projection system 20, on an optical axis OA, that is, on an optical path. The lens drive unit 83 can change the longitudinal position of the image which is projected on the screen SC in FIG. 1 by performing adjustment of movement which causes the whole optical projection system 20 to be moved in the vertical direction which is perpendicular to the optical axis OA.

Hereinafter, the optical projection system 20 according to the embodiment will be described with reference to FIG. 3. The optical projection system 20 includes a main body portion 20a which is configured by combining a plurality of optical devices, such as lenses, and drive mechanisms 61, 62, 63, and 64 which adjust the image forming state of the main body portion 20a by moving a part of or the whole main body portion 20a.

The main body portion 20a includes a first group 30, a second group 40, a third group 60, and a diaphragm 70 in order from the side of the screen SC.

The first group 30 includes a first lens unit 31 and a second lens unit 32. For example, the focus state of the main body portion 20a can be adjusted by slightly moving at least one lens included in the first lens unit 31 manually along the optical axis OA. Further, the second lens unit 32 includes first, second, and third lens groups 32a, 32b, 32c, or the like as shown in FIG. 4A. Each of the lens groups 32a, 32b, and 32c includes one or more lenses. The main body portion 20a can change the projection magnification by moving the lens groups 32a, 32b, 32c, or the like, or at least one lens which is included in the lens groups 32a, 32b, 32c, or the like along the optical axis OA using a zoom drive mechanism 61a embedded in the drive mechanism 61 shown in FIG. 3.

The second group 40 is an adjustment optical device which has focal distances which are different from each other in the lateral direction (X direction) and the longitudinal direction (Y direction). As a result, all the system of the optical projection system 20 including the first group 30 has focal distances which are different from each other in the longitudinal direction and the lateral direction. That is, the magnification in the longitudinal direction is different from the magnification in the lateral direction due to the main body portion 20a, and therefore it is possible to project an image, having the aspect ratio AR2 which is different from the aspect ratio AR0 of the image displayed on the liquid crystal panel 18G (18R, 18B), on the screen SC. The second group 40 includes one or more optical devices for adjustment, which have a rotationally asymmetric surface with respect to the optical axis OA. In particular, with regard to the section of the longitudinal direction (Y direction) shown in FIG. 4B, the second group 40 includes a first optical device group 41 having positive power and a second optical device group 42 having negative power in order from the screen SC. In addition, the first optical device group 41 and the second optical device group 42 do not have power with regard to the section of the lateral direction (X direction) shown in FIG. 4A.

As such, with regard to the longitudinal section, by combining the first optical device group 41 having positive refractive power and the second optical device group 42 having negative refractive power as the second group 40 which is an anamorphic optical system, it is possible to make the second group function as an afocal system, and therefore it is possible to change magnification easily, that is, to perform zooming.

Figure 3:
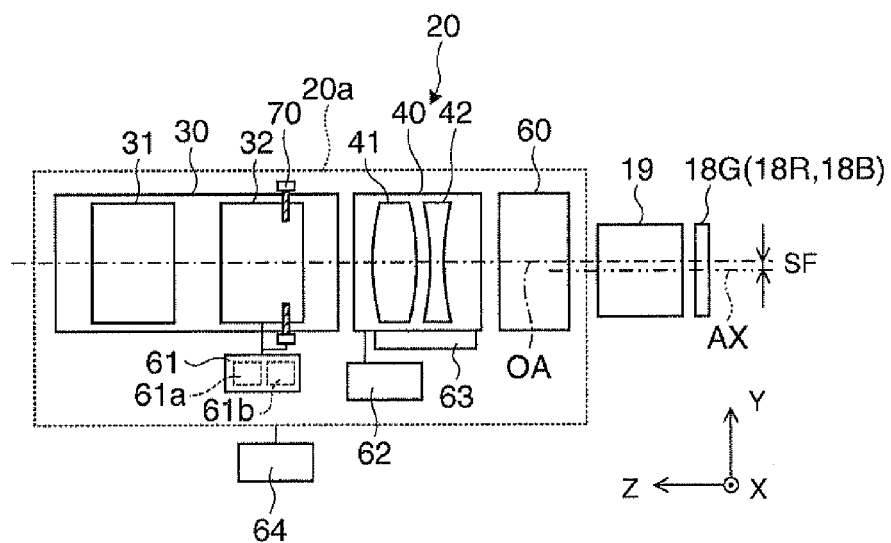
FIG. 3 is a view illustrating the configuration of the optical projection system of the projector shown in FIG. 1.

By advancing and retracting the second group 40 integrally on the optical path using the first anamorphic drive mechanism 62 which is the advance and retract drive mechanism shown in FIG. 3, it is possible to perform conversion on the aspect ratio of the image projected on the screen SC at a desired timing. In particular, as shown in FIG. 5A, by using the first operating state in which the second group 40 is arranged on the optical path, an image can be projected on the screen SC at an aspect ratio (for example, 2.4:1) at which an image to be formed on the liquid crystal panel 18G (18R, 18B) is compressed in the longitudinal direction. Alternatively, as shown in FIG. 5B, by using the second operating state in which the second group 40 is withdrawn from the optical path, the image can be projected on the screen SC at the aspect ratio (for example, 1.78:1) of the image as it is to be formed on the liquid crystal panel 18G (18R, 18B). The configuration that compresses the image projected on the screen SC in the longitudinal direction using the second group 40 is effective when using the screen SC in which the horizontal dimension is fixed. That is, it is possible to perform conversion only on the aspect ratio without changing the projection distance or the like with respect to the screen SC using the optical projection system 20. In addition, the first optical device group 41 and the second optical device group 42 which are included in the second group 40 can be moved in the direction of the optical axis OA using the second anamorphic drive mechanism 63. By adjusting the distance therebetween, the aspect ratio of the image to be projected on the screen SC can be continuously increased and decreased.

As shown in FIG. 5B, when the second operating state is used by withdrawing the second group 40 of the optical projection system 20 from the optical path, no devices are arranged at a position of the second group 40 in the optical projection system 20. That is, when the second group 40 is withdrawn, since the optical projection system 20 includes only a rotationally symmetric optical device as the first group 30 and the third group 60 cooperate, the aspect ratio of the display region A0 of the liquid crystal panel 18G (18R, 18B) coincides with the aspect ratio of the display region A2 of the screen SC. Here, the first group 30 is responsible for functioning as an expanding optical system and a variable magnification optical system which are the same as the standard optical projection system, and therefore it is possible to form an image of the liquid crystal panel 18G on the screen SC using the first group 30 only. Furthermore, transmittance improves when the second group 40 is withdrawn, and thus it is possible to brighten the image.

Further, as shown in FIG. 3, in the optical projection system 20, by adjusting the amount of shift by moving the whole main body portion 20a in the direction which is perpendicular to the optical axis OA using the entire system drive mechanism 64, the amount of deviation can be increased and decreased from the optical axis OA of the image to be projected on the screen SC. That is, by moving the optical axis OA of the main body portion 20a by only an appropriate amount of shift SF with respect to the central axis AX of the liquid crystal panel 18G while maintaining the state of the optical axis OA of the main body portion 20a to be parallel to the central axis AX of the liquid crystal panel 18G, the image can be projected on a position which is separated from the optical axis OA, for example, in the upper direction (+Y direction), and the projection position of the image can be vertically moved in the longitudinal direction by adjusting the amount of shift SF. In addition, the amount of shift SF, which is the amount of deviation based on the central axis AX of the liquid crystal panel 18G of the optical axis OA of the main body portion 20a, is not necessarily variable, and can be fixed to, for example, a value which is not 0. Further, the whole main body portion 20a can be appropriately moved in the direction along the optical axis OA using the entire system drive mechanism 64.

The third group 60 includes one or more rotationally symmetric lenses, as rotationally symmetric optical devices, having power in the lateral direction and in the longitudinal direction. Since the third group 60 has positive power, the third group 60 can restrain the spread of light which is emitted from the light modulation device. Therefore, the third group 60 can restrain the angle of light which is incident on the second group 40, and can restrain aberration which occurs in the second group 40. As a result, the third group 60 can restrain entire aberration. Therefore, the third group 60 includes a plurality of lenses as correction optical devices, and lenses having positive power from among the plurality of lenses include aspherical surfaces as necessary.

The diaphragm 70 is arranged in the vicinity of, for example, any of the lenses included in the second lens unit 32 of the first group 30 in a state where the position can be changed. In the example shown in FIG. 4A, the diaphragm 70 is arranged between the first and second lens groups 32a and 32b of the second lens unit 32. The diaphragm 70 has a function of adjusting the state of image light by partially shading light flux, that is, image light which passes through the first group 30. In particular, the diaphragm 70 causes the section of light flux which passes through the first group 30 to have a prescribed size and shape at a corresponding position of the optical axis OA. Therefore, the emission state of the image light emitted from the liquid crystal panel 18G (18R, 18B) can be adjusted, and therefore the emission angle and direction of the principal ray of the light flux can be adjusted. That is, the emission angle or the like of the principal ray at each position of the screen of the liquid crystal panel 18G (18R, 18B) can be adjusted. Here, the diaphragm 70 slides along the optical axis OA in association with the advance and retraction of the second group 40 using the diaphragm drive mechanism 61b embedded in the drive mechanism 61. That is, the diaphragm drive mechanism 61b of the drive mechanism 61 changes the arrangement of the diaphragm 70 in accordance with the first operating state in which the second group 40 is arranged on the optical path and the second operating state in which the second group 40 is withdrawn from the optical path. Further, the diaphragm 70 moves along the optical axis OA in association with the zooming operation of the second lens unit 32 of the first group 30 using the zoom drive mechanism 61a embedded in the drive mechanism 61 in any one of the first operating state and the second operating state. That is, by moving the diaphragm 70 along the optical axis OA, the zoom drive mechanism 61a of the drive mechanism 61 can zoom the emission state of the image light emitted from the liquid crystal panel 18G (18R, 18B), that is, can cause the emission state to be the appropriate state based on projection magnification. As such, the drive mechanism 61 continuously moves the diaphragm 70 with regard to the position along the direction of the optical axis OA in accordance with the zooming operation as the zoom drive mechanism 61a, and moves the diaphragm 70 with regard to the position along the direction of the optical axis OA in accordance with the first and the second operating states as the diaphragm driving mechanism 61b so as to switch the diaphragm 70 in a stepwise manner. In addition, such an operation of the drive mechanism 61 can be realized by, for example, combining two types of cams, or the like.

The above-described drive mechanism 61 using the zoom drive mechanism 61a and diaphragm drive mechanism 61b, the first anamorphic drive mechanism 62 which is the advance and retract drive mechanism, the second anamorphic drive mechanism 63, and the entire system drive mechanism 64 include a motor, a mechanical transmission mechanism, a sensor, or the like, and operate in response to a drive signal from the lens drive unit 83 shown in FIG. 2. These drive mechanisms 61, 62, 63, and 64 do not only independently operate but also compositely operate in response to the drive signal from the lens drive unit 83. In particular, the drive mechanism 61 is in association with the first anamorphic drive mechanism 62 which is the advance and retract drive mechanism that advances and retracts the second group 40 when changing the position of the diaphragm 70 according to whether the drive mechanism 61 is in the first operating state or the second operating state as the diaphragm drive mechanism 61b. In addition, for example, by operating the entire system drive mechanism 64 in accordance with the operation of the drive mechanism 61 as the zoom drive mechanism 61a, a phenomenon or the like that an image shifts when the image is zoomed can be restrained.

Here, the function of the optical projection system 20 shown in FIG. 3 or the like will be described in further detail. In the case of the optical projection system 20, the second group 40 can advance and retract on a ray at a position where is comparatively close to the liquid crystal panel 18G (18R, 18B) and the ray of each image height passes through the second group along a path which is comparatively close to the image height, so that the ray can be easily controlled. Therefore, the occurrence of aberration attributable to the operation that the second group 40 advances and retracts on the ray can be restrained. Generally, it is difficult to manufacture a rotationally asymmetric optical device, and it is necessary to miniaturize the second group 40 in order to achieve accuracy. At this point, as the second group 40 is closer to the liquid crystal panel 18G (18R, 18B), the ray is less spread, and the first optical device group 41 and the second optical device group 42 which are included in the second group 40 as the adjustment optical device can be miniaturized. Therefore, it is expected that a highly precise lens processing is performed on the optical device groups 41 and 42, the performance of the optical projection system 20 is improved and the cost thereof can be reduced. Further, the optical projection system 20 includes the third group 60 which is the closest to the liquid crystal panel 18G (18R, 18B), so that aberration can be effectively and reasonably corrected using the comparatively simple optical system. With such a third group 60, it is possible to further remarkably attempt to improve performance. In particular, it is possible to make marginal light incident on the second group 40 substantially parallel to the optical axis OA using the third group 60. That is, it is possible to restrain the spread of light flux within the second group 40, and it is possible to prevent the diameter of the second group 40 from increasing. Further, the substantially afocal system is used for the anamorphic type second group 40, so that it is possible to secure accuracy while lowering the request for the accuracy of the position of lenses included in the second group 40.

Figure 6A:
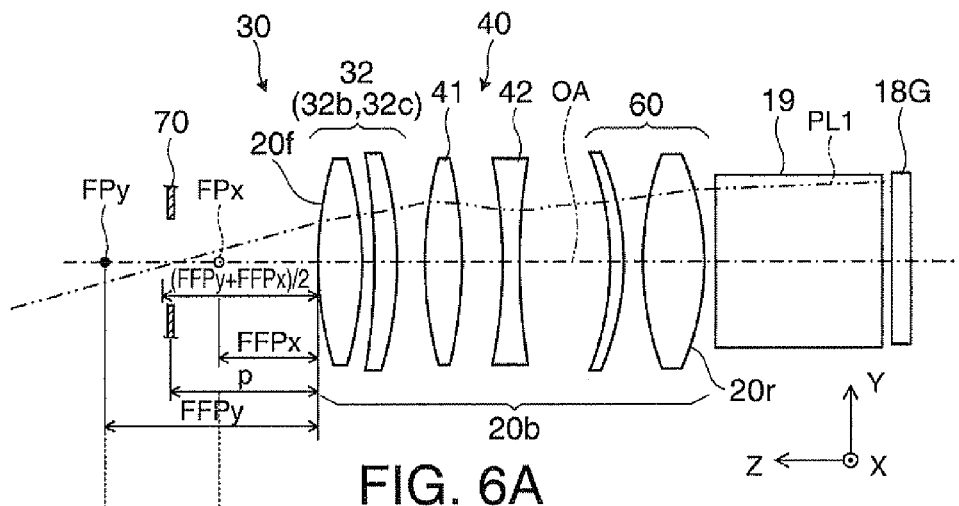
FIGS. 6A and 6B are longitudinal section and lateral section views each illustrating a focal position and a diaphragm position in the first operating state.
Figure 6B:
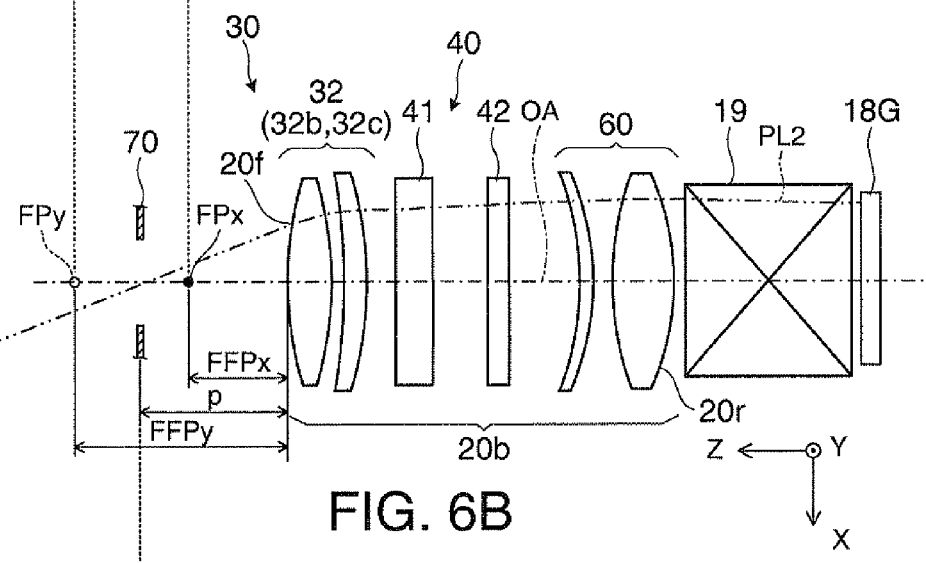
Figure 6C:
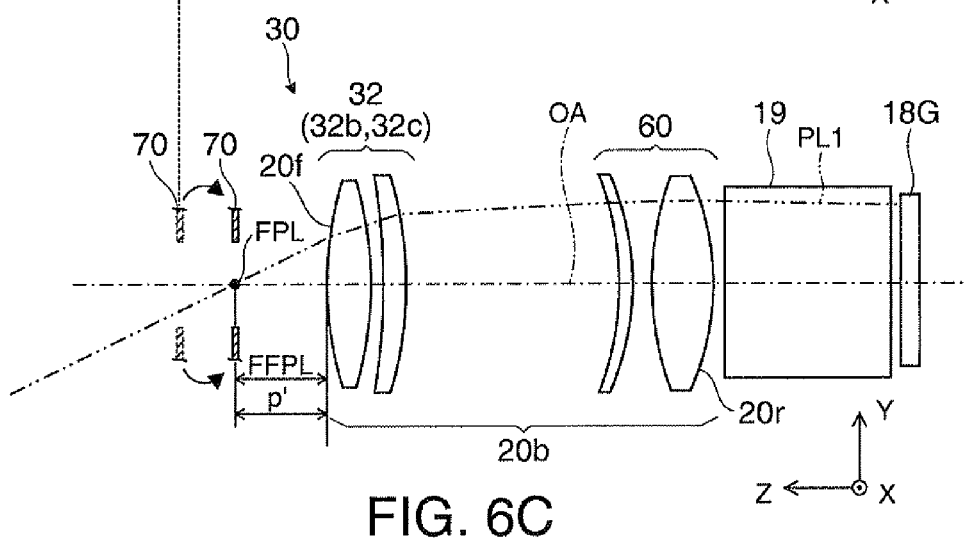
FIG. 6C is a longitudinal section view illustrating a focal position and a diaphragm position in the second operating state.

FIGS. 6A and 6B are views illustrating the arrangement of the diaphragm 70 of the optical projection system 20 in the first operating state in which the second group is arranged on the optical path. FIG. 6C is a view illustrating the arrangement of the diaphragm 70 of the optical projection system 20 in the second operating state in which the second group 40 is withdrawn from the optical path. Here, in the optical projection system 20, a light modulation device side lens group 20b, which is arranged from the liquid crystal panel 18G (18R, 18B) to the diaphragm 70 as a section which affects the telecentricity of a subject side will be considered. In this case, the light modulation device side lens group 20b includes the second and third lens groups 32b and 32c of the second lens unit 32 of the first group 30, the second group 40, and the third group 60. That is, the third lens group 32c of the first group 30, the second group 40, and the third group 60 are arranged in the subject side of the diaphragm 70.

First, in the first operating state shown in FIGS. 6A and 6B, it is assumed that the distance between the diaphragm 70 and the screen SC side end surface 20f of the light modulation device side lens group 20b is set to p. In the longitudinal section of the light modulation device side lens group 20b, that is, in the YZ section shown in FIG. 6A, it is assumed that the distance between the screen SC side focus FPy of the light modulation device side lens group 20b and the screen. SC side end surface 20f of the light modulation device side lens group 20b is set to FFPy. Further, in the lateral section of the light modulation device side lens group 20b, that is, in the XZ section shown in FIG. 6B, it is assumed that the distance between the screen SC side focus FPx of the light modulation device side lens group 20b and the screen SC side end surface 20f of the light modulation device side lens group 20b is FFPx. In this case, the distance p between the end surface 20f and the diaphragm 70 is set between the distance FFPx and the distance FFPy. That is, if FFPx<FFPy, distance p is set to be within the range of Condition (1) below.

$$FFPx < p < FFPy \quad (1)$$

In addition, if FFPy<FFPx, the distance p is set to be within the range of Condition (1)' below.

$$FFPy < p < FFPx \quad (1)'$$

Here, the optical projection system 20 illustrated in FIGS. 6A and 6B has the focus FPx of the lateral section which is closer to the end surface 20f than the focus FPy of the longitudinal section, so that FFPx<FFPy, thereby having relatively large magnification power in the lateral direction and increasing the aspect ratio of the image. In this case, the distance p is set to be within the range of Condition (1), thereby being greater than the lower limit FFPx and being lower than the upper limit FFPy.

It can be seen that the above Conditions (1) and (1)' define the arrangement range of the diaphragm 70 in order to excellently maintain the telecentricity of the optical projection system 20 while the direction of a field angle is considered. When the diaphragm 70 is arranged in the ranges of Conditions (1) and (1)', it is possible to secure the usage efficiency of light by improving the telecentricity. Therefore, it is possible to improve the performance of the projector 2. For example, in the case of the optical projection system 20 which is a type that compresses the image in the longitudinal direction, generally FFPx<FFPy. Therefore, the light flux, corresponding to the greatest field angle of the light flux up to the liquid crystal panel 18G (18R, 18B) side end surface 20r of the light modulation device side lens group 20b, is not parallel to the optical axis OA and has an inclination. In particular, the principal ray PL1 corresponding to the image at the periphery of the longitudinal section slops inward of the screen SC, and the principal ray PL2 corresponding to the image at the periphery of the lateral section slops outward of the screen SC. As a result, the optical projection system 20 is not telecentric to any direction of the longitudinal and lateral directions in a strict sense but improves the telecentricity in a balanced manner with regard to the longitudinal direction and the lateral direction. In addition, if the diaphragm 70 is arranged in the side of the screen SC while exceeding the upper limit of Condition (1), all the principal rays corresponding to the images at the periphery of the lateral section and the longitudinal section slop outward of the screen SC to be separated from the optical axis OA, so that the telecentricity of the optical projection system 20 is greatly destroyed. In contrast, if the diaphragm 70 is arranged in the side of the screen SC while exceeding the upper limit of Condition (2), all the principal rays corresponding to the images at the periphery of the lateral section and the longitudinal section slop inward of the screen SC to be close to the optical axis OA, so that the telecentricity of the optical projection system 20 is greatly destroyed.

The preferable arrangement of the diaphragm 70 is in the range from the intermediate position between the focus FPy of the longitudinal section of the light modulation device side lens group 20b and the focus FPx of the lateral section of the light modulation device side lens group 20b to the focal position of the end surface 20f side or the subject side. That is, if FFPx<FFPy, the distance p is set in the range of following Condition (2).

$$FFPx < p \leq (FFPy + FFPx)/2 \qquad (2)$$

Further, if FFPy<FFPx, the distance p is set to be within the range of Condition (2)' below.

$$FFPy < p \leq (FFPy + FFPx)/2 \qquad (2)'$$

Here, in the optical projection system 20 illustrated in FIGS. 6A and 6B, FFPx<FFPy, so that the aspect ratio of an image having relatively large magnification power in the lateral direction is increased. In this case, the distance p is set to be within the range of Condition (2). The distance p is greater than the lower limit FFPx and lower than the upper limit (FFPy+FFPx)/2. Therefore, it is possible to comparatively improve the telecentricity in the intermediate direction of the lateral direction and the longitudinal direction, it is possible to reduce the directional bias of telecentricity, and it is possible to project a bright image in which it is difficult for unevenness depending on the direction of observation or the like to arise.

Next, in the second operating state shown in FIG. 6C, the distance between the diaphragm 70 and the end surface 20f on the screen SC side of the light modulation device side lens group 20b is set to p'. In the longitudinal section of the light modulation device side lens group 20b, that is, in the YZ section shown in FIG. 6C, it is assumed that the distance between the screen SC side focus FPL of the light modulation device side lens group 20b and the screen SC side end surface 20f of the light modulation device side lens group 20b is set to FFPL. In this case, the distance p' between the end surface 20f and the diaphragm 70 is set to be substantially equal to the distance FFPL. That is, the diaphragm 70 moves along the extending direction of the optical axis OA using the drive mechanism 61 (refer to FIG. 3) as the diaphragm drive mechanism such that the distance p' is as follows.

$$p' \cong FFPL \qquad (3)$$

In this case, in the second operating state, it is possible to reduce the directional bias of telecentricity. In addition, when accurately p'=FFPL, it is appropriate to implement the telecentricity. However, it is actually necessary to consider the aberration of the lens, and, as far as possible, it is preferable that the value of p' be as close to FFPL as possible.

Figure 7A:
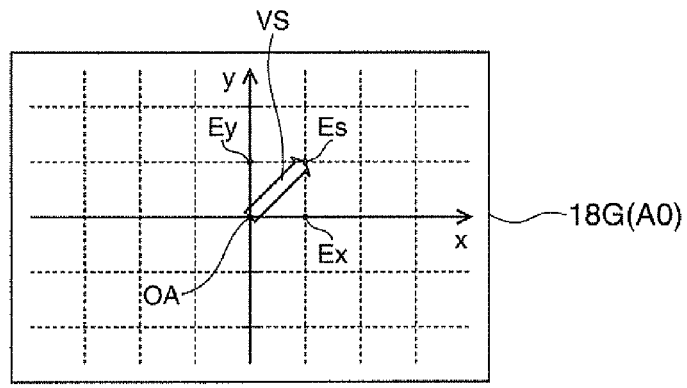
FIG. 7A is a view illustrating the position of a liquid crystal panel on the display region.

Hereinafter, the coordinates of the display region A0 of the liquid crystal panel 18G will be considered as a premise in order to consider the position of the diaphragm 70 in the first operating state with reference to FIG. 7A. Here, an x axis corresponding to the lateral X direction and y axis corresponding to the longitudinal Y direction are determined based on the optical axis QA. When the emission angle of the principal rays from the liquid crystal panel 18G is considered in the optical projection system 20 having a vertically and horizontally asymmetric anamorphic type lens system, it has been known that it is not sufficient to consider only a horizontal axis position along an x axis and a vertical axis position along a y axis, and it is necessary to consider a position in the oblique direction. That is, the emission angle (principal ray angle) of the principal ray is considered in the direction shown using oblique vector VS in the drawing. Here, it is assumed that the horizontal axis position along the x axis and the principal ray angle from the horizontal axis position have an approximately substantially line shape, and the vertical axis position along the y axis and the principal ray angle from the vertical axis position have an approximately substantially line shape. In the same manner, an oblique position Es which is parallel to the vector VS and the principal ray angle from the oblique position Es can be handled to have a substantially line shape.

Figure 7B:
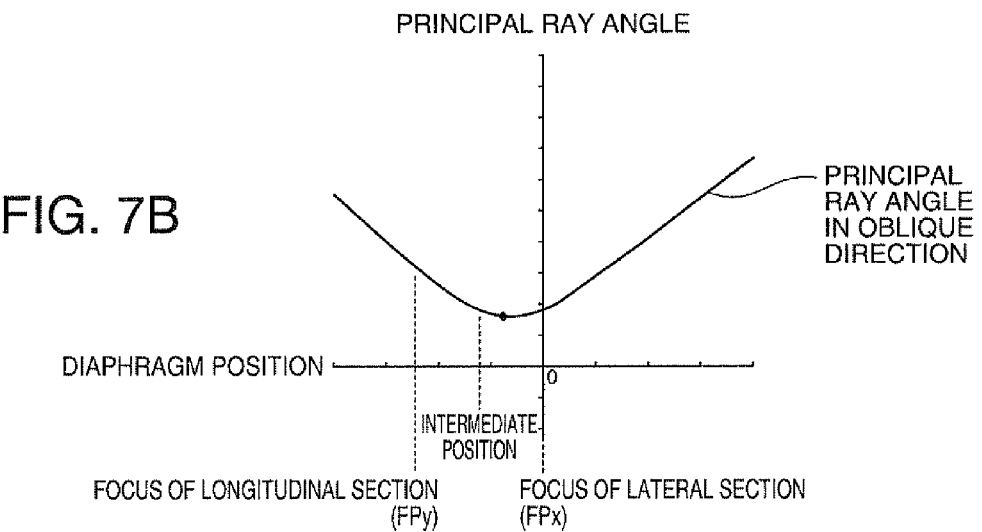
FIG. 7B is a view illustrating the relationship between a principal ray angle and a diaphragm position in the oblique section of the liquid crystal panel.

FIG. 7B illustrates an example of a result of simulation in which the principal ray angle of the oblique position Es of the apex of the vector VS is calculated while changing the position of the diaphragm 70.

As is clear from the chart, the minimum value of the principal ray angle exists between the focus FPy of the longitudinal section and the focus FPx of the lateral section of the light modulation device side lens group 20b. That is, when the position of the diaphragm 70 is set between the focus FPy of the longitudinal section and the focus FPx of the lateral section, it can be seen that the increase in the principal ray angle can be restrained as a whole. In other words, it is preferable that the distance p ranging from the end surface 20f of the light modulation device side lens group 20b to the diaphragm 70 be set between the distance FFPx and the distance FFPy. That t is preferable that the distance p be set within the range of the above Condition (1).

Further, if observed more finely, the minimum value of the principal ray angle exists between the intermediate position of the focus FPy of the longitudinal section and the focus FPx of the lateral section and the focus FPx of the lateral section. That is, when the position of the diaphragm 70 is set between the intermediate position of a pair of focuses FPy and FPx and the focus FPx of the lateral section, it can be considered that the increase in the principal ray angle is restrained as a whole. In other words, it can be considered that it is preferable that the distance p from the end surface 20f of the light modulation device side lens group 20b to the diaphragm 70 be equal to or less than the average of the distance FFPx and the distance FFPy and equal to or greater than the distance FFPx. That is, it is preferable that the distance p be set within the range of the above Condition (2).

Figure 7C:
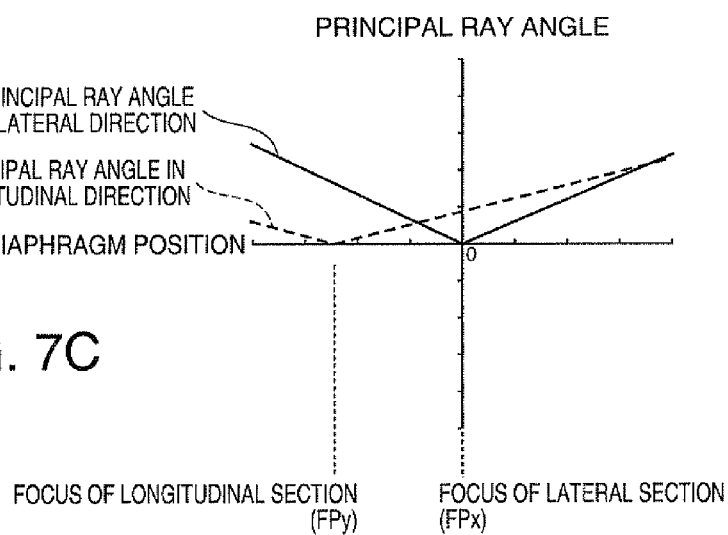
FIG. 7C is a view illustrating the relationship between a principal ray angle and a diaphragm position in the crosswise section of the liquid crystal panel.

FIG. 7C illustrates an example of a result of simulation in which the principal ray angle of a position Ex along the lateral x axis and a position Ey along the longitudinal y axis is calculated while changing the position of the diaphragm 70. As can be seen from a chart, when the diaphragm 70 is arranged at the focus FPx of the lateral section in the horizontal axis position Ex, the principal ray angle is 0. Meanwhile, when the diaphragm 70 is arranged at the focus FPy of the longitudinal section in the vertical axis position Ey, the principal ray angle is 0.

As described above, in consideration of the direction of the field angle in the first operating state, the optical projection system 20 according to the embodiment is substantially telecentric in the subject side in both the first operating state into which the anamorphic optical system is inserted and the second operating state from which the anamorphic optical system is withdrawn. That is, rays from the liquid crystal panel 18G (18R, 18B) are nearly parallel to the optical axis OA in the longitudinal section, the lateral section, and the oblique section. Therefore, it is possible to relatively simply combine the liquid crystal panel 18G (18R, 18B) and the optical projection system 20 with high accuracy, so that the assembly property thereof is good. Further, if light exiting from the liquid crystal panel 18G (18R, 18B) is integrated with optical projection system 20 in a substantially telecentric state when projection is performed using movement in such a way that the optical projection system 20 is moved in the direction perpendicular to the optical axis OA, it is easy to secure the amount of peripheral light, thereby contributing to the improvement of image quality. In addition, when a three-plate type light modulation device is used, by using a substantially telecentric state, it is possible to improve the quality of the image as color unevenness can be reduced.

Further, in the case of the optical projection system 20 according to the embodiment, in the second operating state as shown in FIG. 5B, the first group 30 and the third group 60 are fixedly installed on the optical path and the second group 40 is advanced and retracted on the optical path. This point is greatly different from the case where the rear arrangement-type relay system (refer to JP-A-2004-027496) in the related art is applied to a projection system. That is, when the rear arrangement-type relay system is detached from the rear arrangement-type relay system in the related art, the optical projection system approaches the imaging device as much as a portion approximate to the rear arrangement-type relay system. Meanwhile, in the case of the optical projection system 20 according to the embodiment, even when the second group 40 is detached and withdrawn from the optical path, it is seldom necessary to change the position of the first group 30 or the third group 60. That is, in the case of crosswise magnification conversion which causes the second group 40 to be advanced and retracted on the optical path, it is not necessary to greatly move the first group 30 or the third group 60, and it is possible to reduce the load of a mechanical mechanism. In addition, when the rear arrangement-type relay system in the related art is applied to a projection system, the crosswise magnification conversion can be performed by advancing and retracting the second group 40 which is a part of the rear arrangement-type relay system on the optical path. However, even when the second group is advanced and retracted on the optical path for the crosswise magnification conversion, the main optical system is not greatly moved. Further, the rear arrangement-type relay system in the related art is fixed to the mount of the main optical system instead of the main optical system which can be independently used. Therefore, in the case of the rear arrangement-type relay system in the related art, there are problems in that the optical burden thereof increases, the length thereof increases in the optical axis direction, and the number of constituent lenses increases. However, according to the optical projection system 20 of the embodiment, it is not necessary to cause the second group 40 to function as a relay lens, and it is possible to shorten the total length thereof and to reduce the number of constituent lenses. Further, unlike the rear arrangement-type relay system in the related art, in the case of the optical projection system 20 of the embodiment, not only a part but also the whole second group 40 is advanced and retracted while being independent of the first group 30 and the third group 60. Therefore, when the second group 40 is advanced and retracted or attached and detached, effect such as eccentric to the first group 30 and the third group 60 can be reduced, and, further, comparatively independent arrangement can be realized in mechanical manner. When the optical projection system 20 is assembled, if the assembly accuracy between the separate first group 30 and third group 60 is considered while regarding the second group 40 as a unit, the improvement of assembly property can be expected.

In the optical projection system 20, the optical axis OA of the main body portion 20a can be moved by an appropriate amount of shift SF while the optical axis OA of the main body portion 20a is maintained to be parallel to the central axis AX of the liquid crystal panel 18G, so that it is possible to perform projection using movement, and it is easy to prevent audiences and the image light PL from interfering with each other, and installation property thereof is improved. In the state in which the main body portion 20a of the optical projection system 20 shifts with respect to the liquid crystal panel 18G as described above, if zooming, in which the second lens unit 32 is operated and then projection magnification is changed, is performed by the zoom drive mechanism 61a embedded in the drive mechanism 61, the absolute amount of shift of the image light PL increases. Therefore, it is possible to improve the operability and installation property of the projector 2 by correcting the increase in the amount of shift attributable to zooming using the operation of the entire system drive mechanism 64. At this time, under the control of the main control unit 88, operability is further improved by automating the operation in association with the zoom drive mechanism 61a and the entire system drive mechanism 64.

In the case of the optical projection system 20 of the embodiment, one side or both sides of each of the optical device groups 41 and 42 which construct the second group 40 which is the adjustment optical device is a cylindrical lens surface. The cylindrical lens can be expected as highly accurate because the cylindrical lens is easily processed, and the cost thereof can be reduced. Further, the sensitivity eccentricity of the plane section side is low and assembly property is improved, so that high performance can be expected as a result. That is, by constructing the second group 40 using the cylindrical lens, cost can be reduced while the accuracy of the optical projection system 20 is secured.

The one side or both sides of each of the optical device groups 41 and 42 which construct the second group 40 is not limited to the cylindrical lens surface, and an anamorphic lens (for example, toric or toroidal lens) can be used.

In the above description, the one side or both sides of each of the cylindrical-type or anamorphic lens-type optical device groups 41 and 42 which construct the second group 40 can have an aspherical surface type, in detail, a shape expressed using the following polynomial expression h with respect to the lateral X section or the longitudinal Y section.

$$h = \frac{cy^2}{1 + \sqrt{1 - (1+k)c^2y^2}} + A_2 y^2 + A_4 y^4 + A_6 y^6 + A_8 y^8 + A_{10} y^{10} + \ldots$$

Here, y is the height of an image (image height) from the optical axis OA, c is the curvature of a spherical surface as the standard, k is a conic constant, and each of $A_2$, $A_4$, $A_6$, $A_8$, $A_{10}$, ... is a predetermined correction term.

Further, a free-form surface can be used as the one side or both sides of each of the optical device groups 41 and 42 which construct the second group 40. Since curvatures can be controlled in both sections of the Y direction and the X direction by using the anamorphic lens, astigmatic aberration can be reduced and high performance can be realized. Further, by using an aspherical surface, various types of aberrations can be reduced and high performance can be realized. Further, by using a free-form surface, it is easy to optimize the image forming state in the intermediate oblique direction, other than the longitudinal and lateral directions of the liquid crystal panel 18G (18R, 18B), in the image circle surface on the screen SC or on the liquid crystal panel 18G (18R, 18B), and it is possible to realize high performance.

The second group 40 is not limited to the two optical device groups 41 and 42, and can be configured with three or more optical device groups. At this time, it is preferable that color aberration should not occur because of the second group 40. Therefore, it is preferable that the following relationship be realized:

$$\Sigma(\phi i \times v i) \cong 0$$

where $\phi i$: the refractive index of each lens included in the second group 40

$v i$: the Abbe number of each lens included in the second group 40.

FIGS. 8A and 8B are views illustrating the modification example of the optical projection system 20 shown in FIGS. 4A and 4B. The second group 140 has focal distances which are different from each other in the longitudinal direction (Y direction) and in the lateral direction (X direction). As a result, all the system of the optical projection system 20 including the first group 30 has focal distances which are different from each other in the longitudinal direction and the lateral direction. In this case, with regard to the section of the lateral direction (X direction), the second group 140 includes a first optical device group 141 having negative power, and a second optical device group 142 having positive power in order from the screen SC. As shown in FIG. 8E, when the second group 140 is withdrawn from the optical path, an image can be projected on the screen SC at an aspect ratio (for example, 1.78:1) of the image as it is formed on the liquid crystal panel 18G (18R, 18B). Further, as shown in FIG. 8A, an image can be projected on the screen SC at an aspect ratio (for example, 2.4:1) by arranging the second group 40 on the optical path, and expanding an image to be formed on the liquid crystal panel 18G (18R, 18B) in the lateral direction. Further, by moving the first optical device group 141 and the second optical device group 142, which are included in the second group 140, in the direction of the optical axis OA using the second anamorphic drive mechanism 63 shown in FIG. 3 and adjusting the distance therebetween, the aspect ratio of an image to be projected on the screen SC can be continuously increased or reduced. Furthermore, the configuration of expanding the image projected on the screen SC in the lateral direction using the second group 40 is effective when using a screen SC in which the vertical dimension is fixed. That is, it is possible to perform conversion on the aspect ratio only without changing the projection distance or the like with respect to the screen SC using the optical projection system 20.

As described above, according to the optical projection system 20 of the embodiment, the light modulation device side lens group 20b has power different from each other in the longitudinal direction and the lateral direction of the liquid crystal panel 18G (18R, 18B). Therefore, even the entire system of the optical projection system 20 has focal distances which are different from each other in the longitudinal and lateral directions, and magnifications which are different from each other in the longitudinal and lateral directions. Therefore, the aspect ratio of the image on the liquid crystal panel 18G (18R, 18B) can be different from the aspect ratio of the image to be projected on the screen SC. That is, conversion can be performed on the aspect ratio, which is a ratio of width to height, by the optical projection system 20. At this time, since the distance p between the diaphragm 70 and the screen SC side end surface 20f of the light modulation device side lens group 20b satisfies the Conditional expressions (1) and (1)' in the first operating state in which the second group 40 is arranged on the optical path, it is possible to secure a predetermined telecentricity or more on both sides, that is, the longitudinal direction and the lateral direction. Further, since the distance p satisfies the Conditional expression (3) in the second operating state in which the second group 40 included in the optical modulation device side lens group 20b is withdrawn from the optical path, it is possible to secure the telecentricity even in the second operating state.

Example 1

Figure 9:
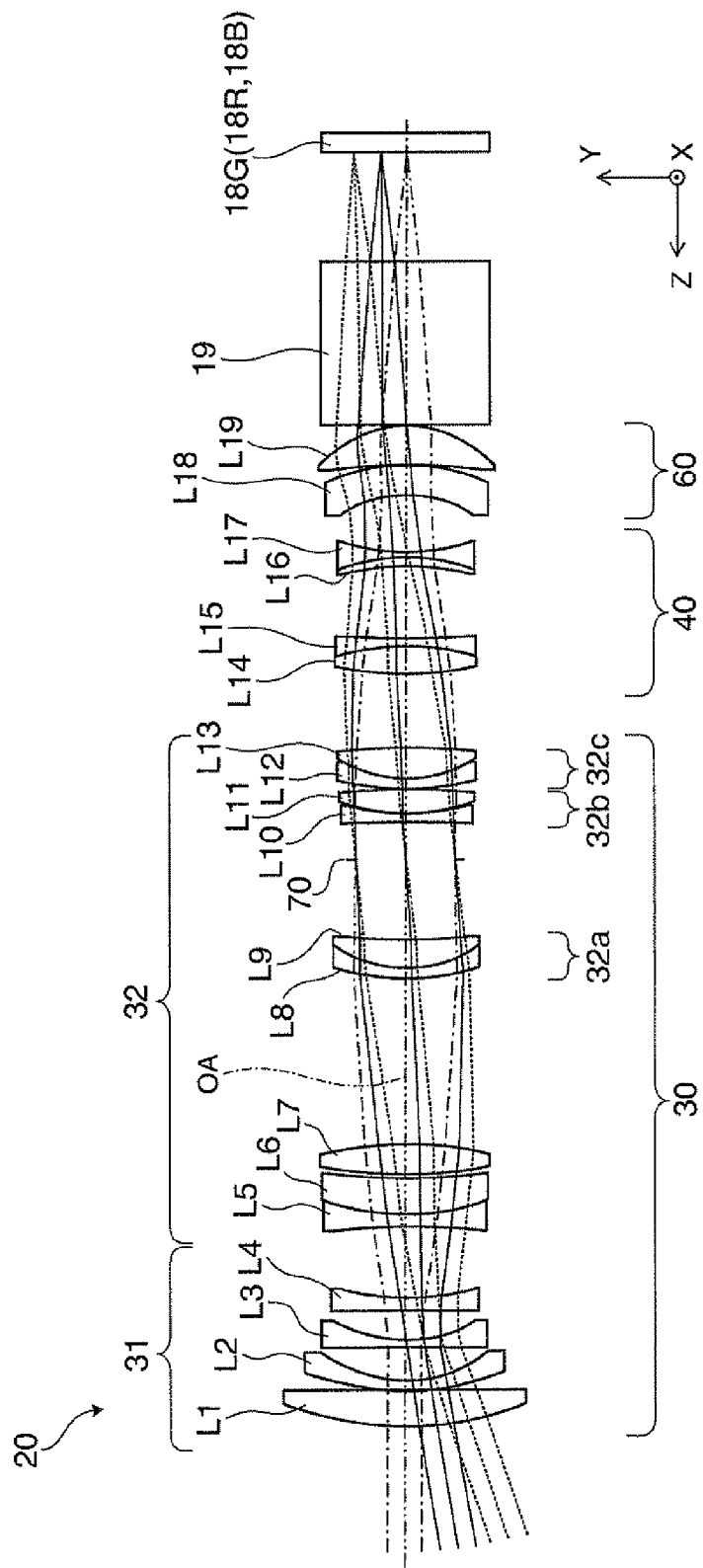
FIG. 9 is a view illustrating a longitudinal section in the first operating state of an optical system according to an Example 1 of the first embodiment.
Figure 10:
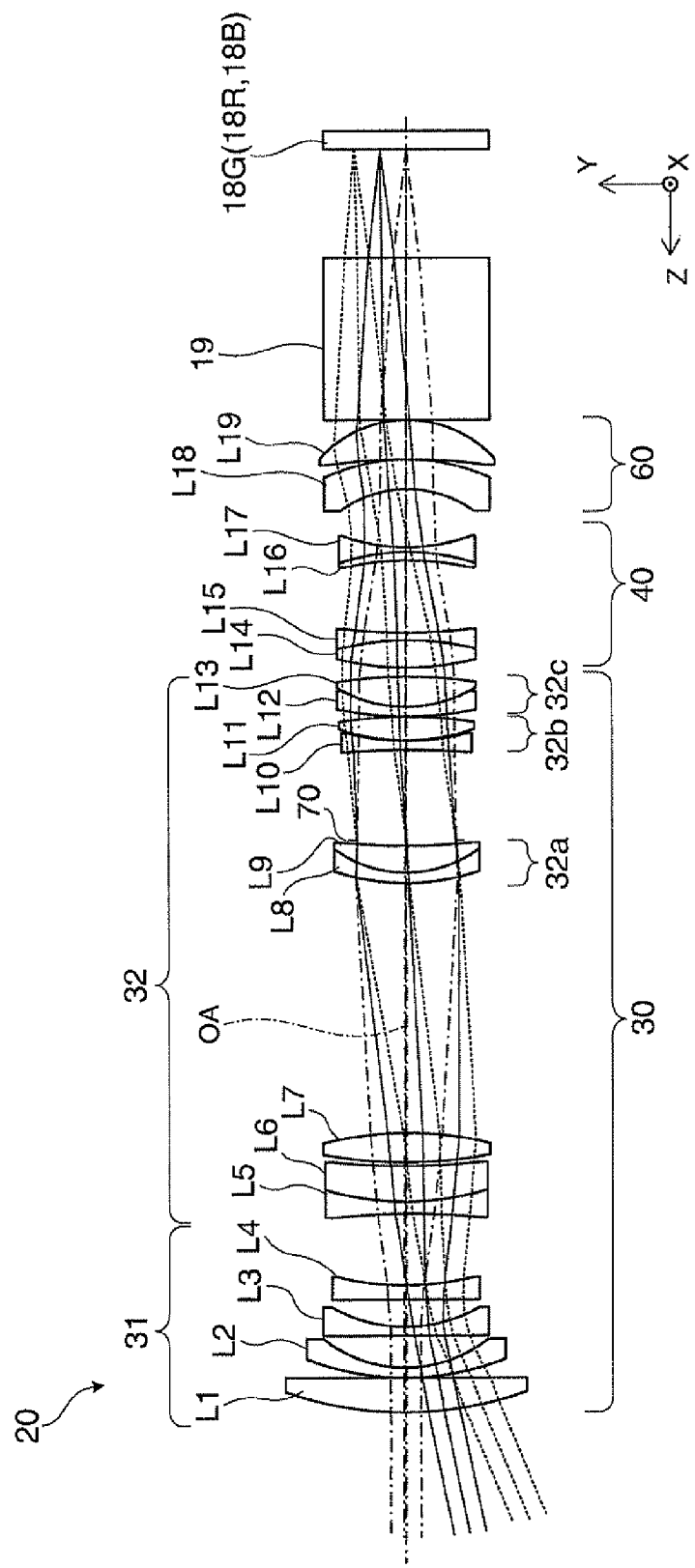
FIG. 10 is a view illustrating the longitudinal section in the case in which the optical system shown in FIG. 9 is a wide end.

FIGS. 9 and 10 are views illustrating a detailed Example 1 of the optical projection system 20 of the first embodiment, and illustrate the optical projection system 20 in the first operating state. FIG. 9 illustrates the state of a "tele end", in which magnification power is comparatively low. FIG. 10 illustrates the state of a "wide end", in which magnification power is comparatively high.

The optical projection system 20 includes lenses L1 to L19. The first group 30 is configured to include the lenses L1 to L13, the second group 40 is configured to include the lenses L14 to L17, and the third group 60 is configured to include the lenses L18 and L19. The lenses L1 to L13 included in the first group 30 are lenses having rotationally symmetric spherical surfaces around the optical axis OA. In the second group 40, the cemented lenses L14 and L16 are lenses that have positive power with regard to the longitudinal Y direction and cylindrical lenses which do not have power with regard to the lateral X direction. Further, the cemented lenses L16 and L17 are lenses that have negative power with regard to the longitudinal Y direction and are cylindrical lenses which do not have power with regard to the lateral X direction. The lens L18 included in the third group 60 is a negative meniscus lens, and the lens L19 is a positive meniscus lens. In addition, the first group 30, the first lens group 32a including the lenses L8 and L9, the second lens group 32b including the lenses L10 and L11, and the third lens group 32c including the lenses L12 and L13 are displaced along the optical axis OA when projection magnification is changed, that is, when zooming is performed. In addition, the lens L18 is an aspherical surface lens. In particular, the shape expressed in the above-described polynomial expression h is applied to an aspherical surface expression in the same manner. That is, the shape is specified by applying an appropriate number.

$$h = \frac{cy^2}{1 + \sqrt{1 - (1+k)c^2y^2}} + A_2y^2 + A_4y^4 + A_6y^6 + A_8y^8 + A_{10}y^{10} + \ldots$$

Figure 11:
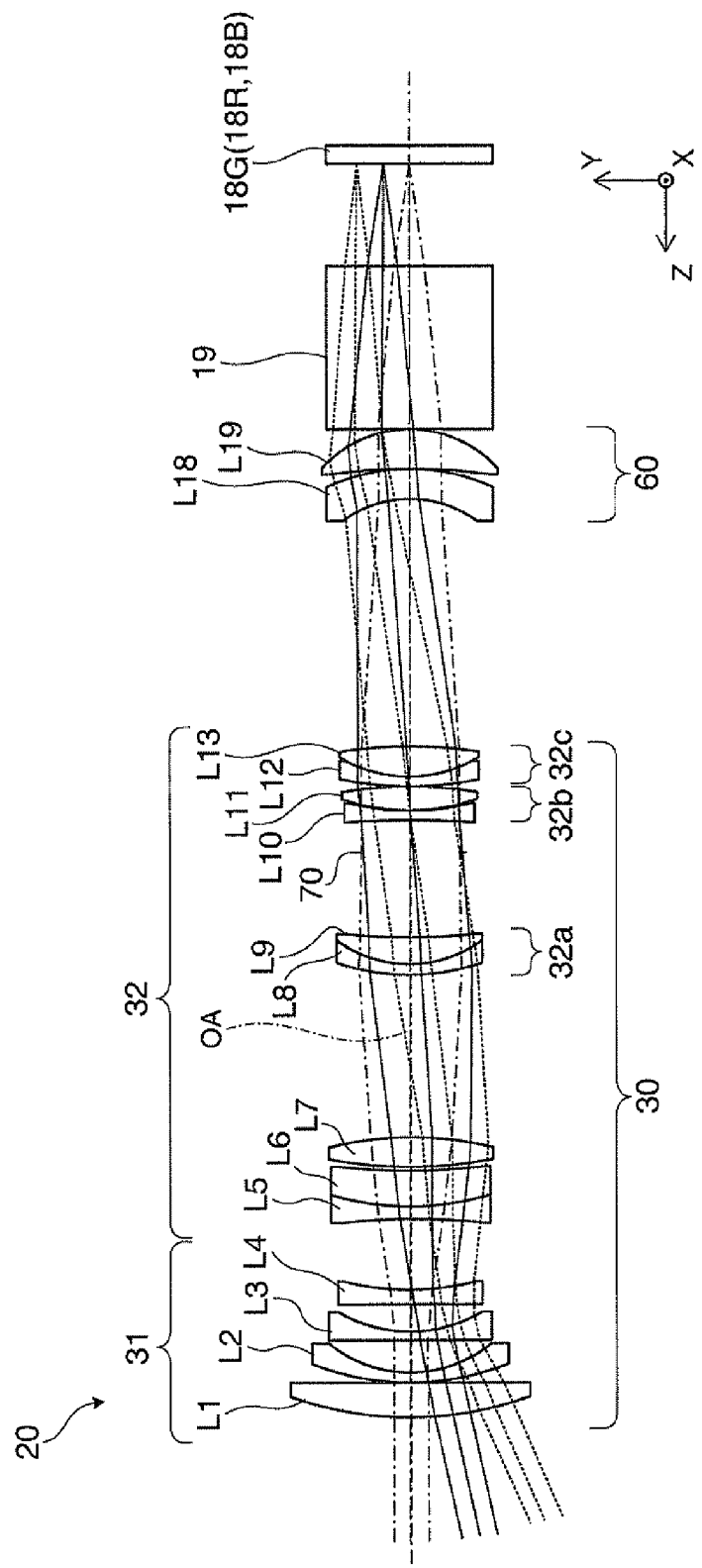
FIG. 11 is a view illustrating the lateral section in the second operating state.
Figure 12:
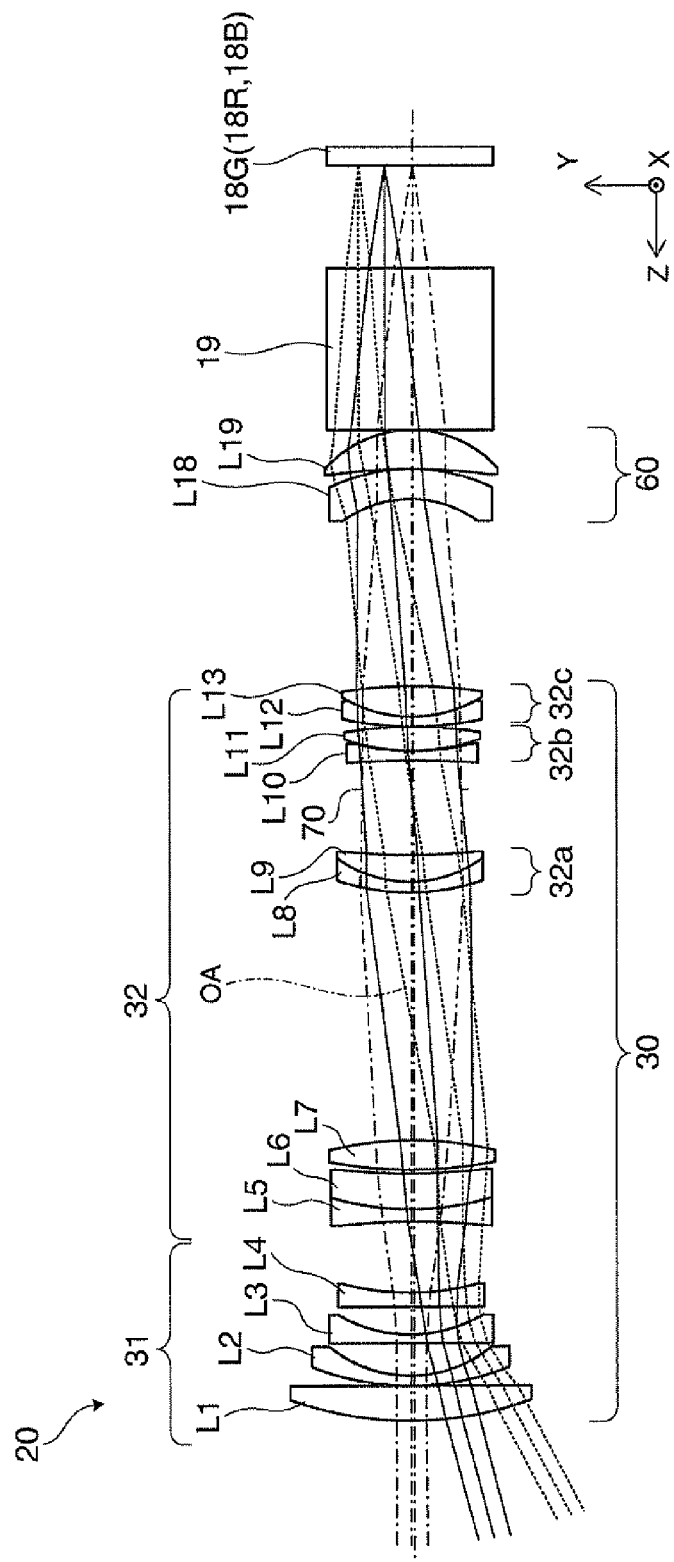
FIG. 12 is a view illustrating a longitudinal section in the case in which the optical system shown in FIG. 11 is a wide end.

Further, FIGS. 11 and 12 are views illustrating a detailed Example 1 of the optical projection system 20 of the first embodiment, and illustrate the optical projection system 20 in the second operating state. FIG. 11 illustrates the state of a "tele end", in which magnification power is comparatively low. FIG. 12 illustrates the state of a "wide end" in which magnification power is comparatively high.

In the following Table 1 and Table 2, the lens data or the like of the Example 1 is displayed. Table 1 relates to the optical projection system 20 in the first operating state, and Table 2 relates to the optical projection system 20 in the second operating state. In the top column of Table 1 and Table 2, "surface number" is a number assigned to the surface of each lens respectively in order from the image surface side. Further, "R1" and "R2" indicate a Y curvature radius and an X curvature radius, and "D" indicates lens thickness or air space between one of the lens surfaces and the other surface. Further, "Nd" indicates the refractive index of the "d" line of a lens material, and "vd" indicates the Abbe number of the "d" line of a lens material. In addition, in the case of Example 1, all surfaces, other than the surface of lens L18, are spherical surfaces or cylindrical surfaces. Further, with respect to the lens L18, which is the aspherical surface lens, the values at the bottom column of Table 1 and Table 2 are applied to the above-described polynomial expression h.

TABLE 1

| Surface No. | R1 | R2 | D | Nd | vd |
|---|---|---|---|---|---|
| 1 | 75.647 | | 7.59 | 1.566689 | 47.3159 |
| 2 | 1015.708 | | 0.10 | | |
| 3 | 60.920 | | 2.20 | 1.567069 | 67.8493 |
| 4 | 28.303 | | 6.98 | | |
| 5 | 470.917 | | 2.20 | 1.846660 | 23.7779 |
| 6 | 31.190 | | 6.40 | | |
| 7 | −413.359 | | 2.77 | 1.539959 | 72.1659 |
| 8 | 63.840 | | 15.81 | | |
| 9 | −196.941 | | 2.73 | 1.692733 | 55.79200001 |
| 10 | 69.015 | | 7.81 | 1.695178 | 30.4615 |
| 11 | 161.586 | | 0.78 | | |
| 12 | 93.545 | | 6.56 | 1.698265 | 30.2514 |
| 13 | −76.142 | | variable | | |
| 14 | 52.845 | | 2.20 | 1.770675 | 40.8326 |
| 15 | 27.272 | | 6.05 | 1.671314 | 32.2634 |
| 16 | 156.092 | | variable | | |
| diaphram | infinite | | variable | | |
| 18 | −234.795 | | 2.20 | 1.809242 | 34.4655 |
| 19 | 56.040 | | 0.10 | | |
| 20 | 47.516 | | 5.10 | 1.499438 | 80.9005 |
| 21 | −102.063 | | 0.10 | | |
| 22 | 72.079 | | 2.20 | 1.807940 | 31.4165 |
| 23 | 30.744 | | 6.63 | 1.544401 | 71.3907 |
| 24 | −103.078 | | variable | | |
| 25 | 59.722 | Infinite | 6.02 | 1.818656 | 43.7189 |
| 26 | −60.027 | Infinite | 1.60 | 1.728835 | 31.1627 |
| 27 | 102.563 | Infinite | 16.21 | | |
| 28 | −70.700 | Infinite | 1.89 | 1.846660 | 23.7779 |
| 29 | −47.067 | Infinite | 1.10 | 1.498714 | 81.0904 |
| 30 | 42.689 | infinite | 13.00 | | |
| *31 | −31.967 | | 6.50 | 1.491755 | 57.4711 |
| *32 | −44.847 | | 0.10 | | |
| 33 | −132.836 | | 8.60 | 1.497039 | 81.5072 |
| 34 | −26.257 | | 0.19 | | |
| 35 | infinite | | 36.00 | 1.516330 | 64.142 |
| 36 | infinite | | | | |

Aspherical surface factor

| Surface No. | K | A4 | A6 | A8 | A10 | A12 |
|---|---|---|---|---|---|---|
| 31 | 0.28 | −1.855E−05 | 1.585E−09 | −7.465E−11 | 2.287E−13 | −8.648E−16 |
| 32 | −5.944 | −1.291E−05 | 1.869E−08 | −3.185E−12 | −1.854E−14 | 2.511E−17 |

*aspherical surface

TABLE 2

| Surface No. | R1 | R2 | D | Nd | vd |
|---|---|---|---|---|---|
| 1 | 75.647 | | 7.59 | 1.566689 | 47.3159 |
| 2 | 1015.708 | | 0.10 | | |

TABLE 2-continued

| | | | | |
|---|---|---|---|---|
| 3 | 60.920 | 2.20 | 1.567069 | 67.8493 |
| 4 | 28.303 | 6.98 | | |
| 5 | 470.917 | 2.20 | 1.846660 | 23.7779 |
| 6 | 31.190 | 6.40 | | |
| 7 | −413.359 | 2.77 | 1.539959 | 72.1659 |
| 8 | 63.840 | 15.81 | | |
| 9 | −196.941 | 2.73 | 1.692733 | 55.79200001 |
| 10 | 69.015 | 7.81 | 1.695178 | 30.4615 |
| 11 | 161.586 | 0.78 | | |
| 12 | 93.545 | 6.56 | 1.698265 | 30.2514 |
| 13 | −76.142 | variable | | |
| 14 | 58.845 | 2.20 | 1.770675 | 40.8326 |
| 15 | 27.272 | 6.05 | 1.671314 | 32.2634 |
| 16 | 156.092 | variable | | |
| diaphram | infinite | variable | | |
| 18 | −234.795 | 2.20 | 1.809242 | 34.4655 |
| 19 | 56.040 | 0.10 | | |
| 20 | 47.516 | 5.10 | 1.499438 | 80.9005 |
| 21 | −102.063 | 0.10 | | |
| 22 | 72.079 | 2.20 | 1.807940 | 31.4165 |
| 23 | 30.744 | 6.63 | 1.544401 | 71.3907 |
| 24 | −103.078 | variable | | |
| *25 | −31.967 | 6.50 | 1.491755 | 57.4711 |
| *26 | −44.847 | 0.10 | | |
| 27 | −132.836 | 8.60 | 1.497039 | 81.5072 |
| 28 | −26.257 | 0.19 | | |
| 29 | infinite | 36.00 | 1.516330 | 64.142 |
| 30 | infinite | | | |

Aspherical surface factor

| Surface No. | K | A4 | A6 | A8 | A10 | A12 |
|---|---|---|---|---|---|---|
| 25 | 0.288 | −1.855E−05 | 1.585E−09 | −7.465E−11 | 2.287E−13 | −8.648E−16 |
| 26 | −5.944 | −1.291E−05 | 1.869E−08 | −3.185E−12 | −1.854E−14 | 2.511E−17 |

*aspherical surface

As shown in FIGS. 9 to 12, because each of the lens groups 32*a*, 32*b*, and 32*c* included in the second lens unit 32, and the diaphragm 70 are separately moved along the direction of the optical axis OA, the zooming operation is separately performed in the first and second operating states.

Figure 13A:
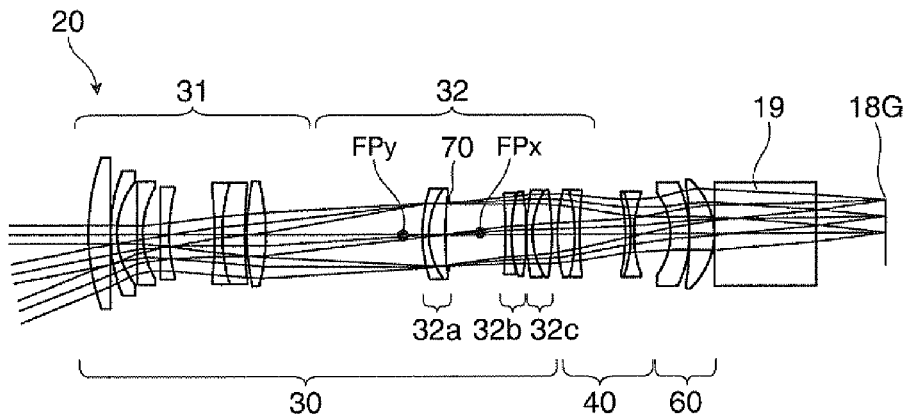
FIGS. 13A to 13C are views illustrating the zooming operation of the optical system in the first operating state of the Example 1.
Figure 13B:
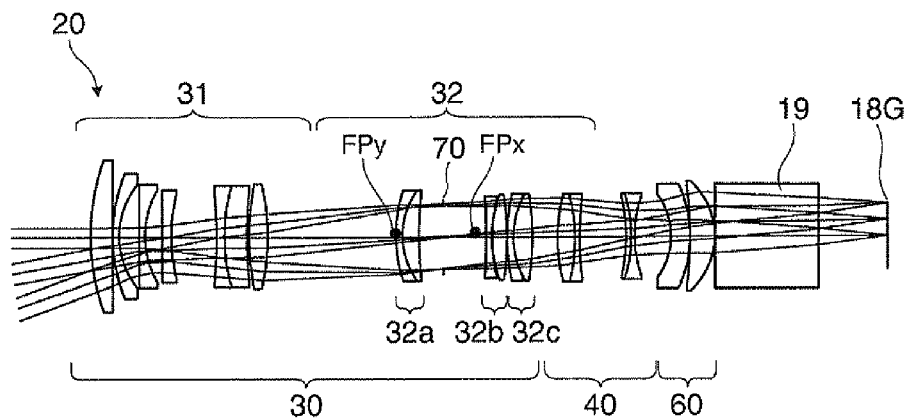
Figure 13C:
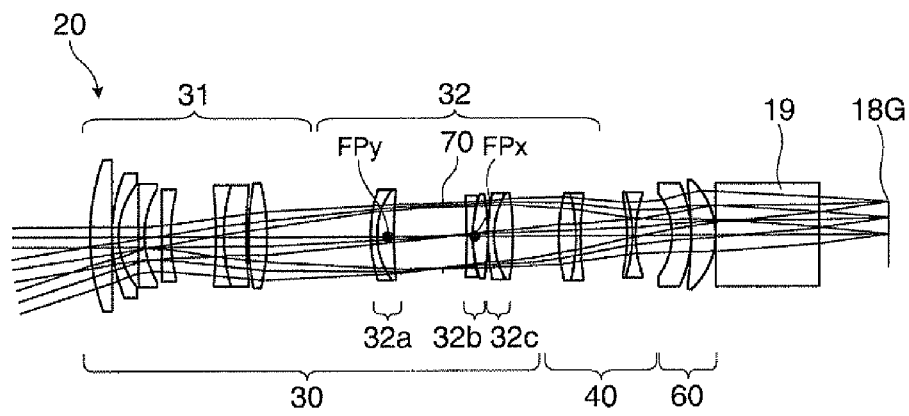
Figure 14A:
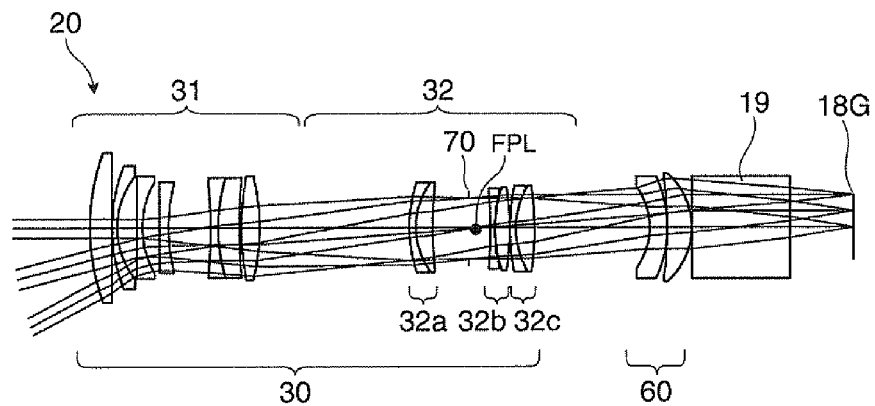
FIGS. 14A to 14C are views illustrating the zooming operation of the optical system in the second operating state of the Example 1.
Figure 14B:
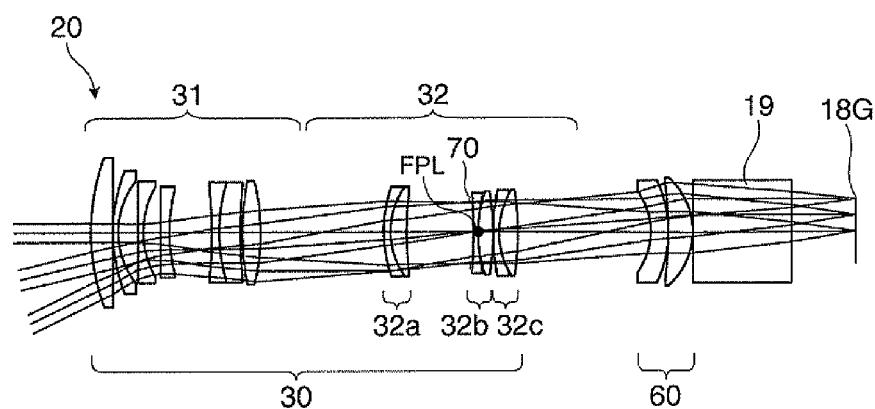
Figure 14C:
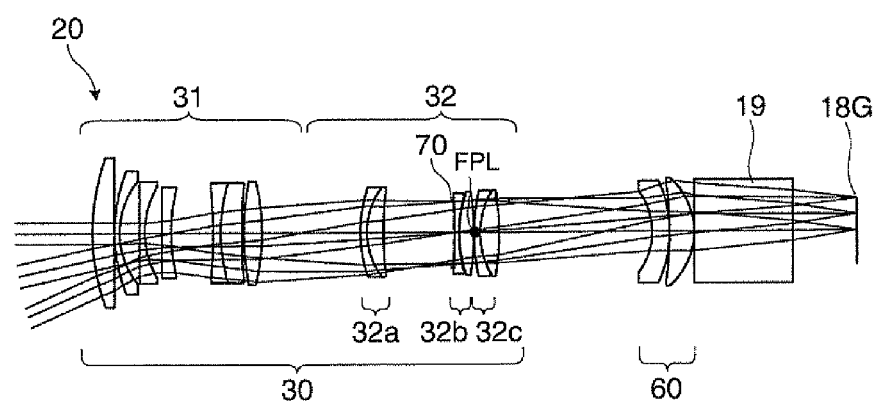

FIGS. 13A to 13C illustrate the zooming operation in the first operating state, and FIGS. 14A to 14C illustrate the zooming operation in the second operating state. FIG. 13A illustrates the state of FIG. 10 of the first operating state, and the case of a "wide end" in which a magnification power is large. Further, FIG. 13B illustrates the case of an "intermediate" state, and FIG. 13C illustrates the state of FIG. 9 and illustrates the case of a "tele end" in which a magnification power is small. In the same manner, FIG. 14A illustrates the case of a "wide end" in the second operating state, FIG. 14B illustrates the case of the "intermediate" state, and FIG. 14C illustrates the case of "tele end". As shown in the drawings, in association with the zooming operation, the position of the diaphragm 70 is changed. That is, the diaphragm 70 is not only arranged at different positions in the first operating state and the second operating state, but also moves by the zooming operation. However, between the focus FPy of the longitudinal section and the focus FPx of the lateral section, the diaphragm 70 is arranged in the subject side, that is, a focus FPx side, by the intermediate position between the focus FPy of the longitudinal section and the focus FPx of the lateral section.

In the top columns of Tables 3 and 4 below, the positions of each of the lens groups 32*a*, 32*b*, and 32*c* of the second lens unit 32 and the diaphragm 70, obtained when the zooming operations shown in FIGS. 13A to 13C and FIGS. 14A to 14C are performed, are displayed. In particular, the image side surface of the lens L8 of the lens group 32*a* is a thirteenth surface, the image side surface of the lens L10 of the lens group 32*b* is a sixteenth surface, and the image side surface of the lens L12 of the lens group 32*c* is a twenty-fourth surface.

TABLE 3

| | Wide | Middle | Tele |
|---|---|---|---|
| 13 | 55.374 | 45.464 | 36.490 |
| 16 | 1.000 | 9.290 | 17.706 |
| diaphram | 19.817 | 14.811 | 8.132 |
| 24 | 2.000 | 8.626 | 15.864 |
| | Focul Distance | | |
| fx | 21.300 | 23.400 | 25.600 |
| fy | 28.160 | 30.934 | 33.829 |
| | Fno | | |
| Fx | 3.08 | 3.18 | 3.29 |
| Fy | 4.08 | 4.21 | 4.35 |

TABLE 4

| | Wide | Middle | Tele |
|---|---|---|---|
| 13 | 55.374 | 45.464 | 36.483 |
| 16 | 15.122 | 23.054 | 24.819 |
| diaphram | 5.676 | 1.028 | 1.000 |
| 24 | 41.814 | 48.441 | 55.679 |
| | Focul Distance | | |
| fx | 21.940 | 24.104 | 26.373 |
| fy | 21.940 | 24.104 | 26.373 |
| | Fno | | |
| Fx | 3.11 | 3.23 | 3.37 |
| Fy | 3.11 | 3.23 | 3.37 |

In addition, the intermediate columns of Table 3 and Table 4 indicate the focal distances between the X direction and Y direction of the optical projection system 20 when the zooming operation is performed. Further, the bottom columns of Table 3 and Table 4 indicate the brightness (F value) in the X direction and Y direction of the optical projection system 20 when the zooming operation is performed.

Second Embodiment

Hereinafter, an optical projection system or the like according to a second embodiment will be described. In addition, the embodiment is the modification example of the optical projection system or the like according to the first embodiment, and portions and items which are not especially described are the same as the case of the first embodiment.

FIGS. 15A and 15B are views illustrating a modification example of an optical projection system 20 shown in FIGS. 4A and 4B. The optical projection system 20 includes a plurality of diaphragms arranged at different positions in the extending direction of the optical axis OA. That is, the optical projection system 20 of the embodiment includes a first diaphragm 170a relatively arranged on the screen side and a second diaphragm 170b arranged in the subject side. The diameter of diaphragms 170a and 170b varies according to the advance and retraction of the second group 40 by the diaphragm drive mechanism 61b (refer to FIG. 3) embedded in the drive mechanism 61. In particular, first, in the first operating state, the first diaphragm 170a becomes a closed state and the second diaphragm 170b becomes an opened state as shown in FIG. 15A, and therefore the first diaphragm 170a of the two substantially functions as a diaphragm. On the other hand, in the second operating state, the second diaphragm 170b becomes a closed state and the first diaphragm 170a becomes an opened state as shown in FIG. 15B, and therefore the second diaphragm 170b of the two substantially functions as a diaphragm. As above, the optical projection system 20 of the embodiment, by changing the opened or closed state of the diaphragms 170a and 170b arranged at different positions, it is possible to arrange the diaphragms at different positions with regard to the direction of the optical axis OA. Furthermore, when performing the zooming operation, both the diaphragms 170a and 170b continuously move in the direction of the optical axis OA by the zoom drive mechanism 61a (refer to FIG. 3) embedded in the drive mechanism 61.

Third Embodiment

Hereinafter, an optical projection system or the like according to a third embodiment will be described. In addition, the embodiment is the modification example of the optical projection system or the like according to the first embodiment, and portions and items which are not especially described are the same as the case of the first embodiment.

FIGS. 16A and 16B are views illustrating an optical projection system 20 according to the third embodiment. With regard to the section of the longitudinal direction (Y direction), a second group 240 of the optical projection system 20 includes a first optical device group 241 having negative power, and a second optical device group 242 having positive power in order from the screen SC. In this case, an image can be projected on the screen SC at an aspect ratio obtained by reducing an image to be formed on the liquid crystal panel 18G (18R, 18B) in the lateral direction.

In the case of the optical projection system 20 shown in FIG. 16A or the like, generally, the focus FPy of the longitudinal section is closer to the liquid crystal panel 18G (18R, 18B) than the focus FPx of the lateral section, so that FFPy<FFPx. In this case, the distance p is set within the range of Condition (1)'.

$$FFPy < p < FFPx \qquad (1)'$$

Therefore, the distance p is greater than the lower limit FFPy and lower than the upper limit FFPx. Accordingly, it is possible to make telecentricity high in both of the lateral direction and the longitudinal direction.

Furthermore, in the case of the optical projection system 20 shown in FIG. 16A or the like, the distance p is set within the range of Condition (2)'.

$$FFPy < p \leq (FFPy + FFPx)/2 \qquad (2)'$$

Therefore, the distance p is greater than the lower limit FFPy and lower than the upper limit (FFPy+FFPx)/2. Therefore, it is possible to make telecentricity relatively high in the intermediate direction of the lateral direction and the longitudinal direction.

Fourth Embodiment

Hereinafter, an optical projection system or the like according to a fourth embodiment will be described. In addition, the embodiment is the modification example of the optical projection system or the like according to the first embodiment, and portions and items which are not especially described are the same as the case of the first embodiment.

FIGS. 17A and 17B are views illustrating the optical projection system 320 according to the fourth embodiment. The optical projection system 320 includes a first group 30 and a second group 40. The optical projection system 320 does not include a third group 60 as in the optical projection system 20 according to the first embodiment. In this case, the position of the diaphragm 70 is the distance between the focus of a lateral section and the focus of a longitudinal section based on the screen SC side end surface of a light modulation device side lens group 20b. The distance p from the screen SC side end surface of the light modulation device side lens group 20b to a diaphragm 70 is between the distance FFPy and the distance FFPx. Further, in the case of the optical projection system 320, the position of the diaphragm 70 is set within a range from the intermediate position, between the focus of the lateral section and the focus of the longitudinal section of the light modulation device side lens group 20b, to the focal position in the side of a liquid crystal panel 18G (18R, 18B).

The second group 40 shown in FIG. 17A or the like can have the same configuration as a second group 140 shown in FIG. 8A or the like. Further, the second group 40 shown in FIG. 17A or the like can have the same configuration as the second group 240 shown in FIG. 16A or the like.

In the optical projection system 320 according to the third embodiment, a lens group having positive power can be added to the second group 40.

The invention is not limited to the above-described embodiments and can be implemented using various types of illustrative embodiments without departing from the gist of the invention.

Further, the second group 40 does not necessary to include only rotationally asymmetric optical device groups 41 and 42, and an asymmetric optical device group can be added in the second group 40.

The liquid crystal panels 18G, 18R, and 18B are not limited to the transmission type and can be a reflective type. Here, "the transmission type" means that the liquid crystal panel passes modulated light therethrough, and the "reflective type" means that the liquid crystal panel reflects modulated light thereon.

Although various colors of images formed on the plurality of liquid crystal panels 18G, 18R, and 18B are combined with each other in the above-described projector 2, an image formed on a certain color or monochrome liquid crystal panel, which is a single light modulation device, can be enlarged and then projected using the optical projection system 20. In this case, since the cross dichroic prism 19 is not necessary, the degree of freedom of the optical design of the optical projection system 20 increases.

As the projector, there are a front projector in which image projection is performed from a direction in which a surface to be projected is observed, and a rear projector in which image projection is performed from a direction which is opposite to the direction in which a surface to be projected is observed. However, the projector shown in FIG. 2 or the like can be configured with any of them.

Instead of the liquid crystal panels 18G, 18R, and 18B, a digital micro mirror device or the like, which uses a micro mirror as a pixel, can be used as the light modulation device.

The entire disclosure of Japanese Patent Application No. 2011-164025, filed Jul. 27, 2011 are expressly incorporated by reference herein.

What is claimed is:

1. An optical projection system which, when an image is enlarged and projected on a surface to be projected, makes an aspect ratio of an image of a light modulation device different from an aspect ratio of the image projected on the surface to be projected, the optical projection system comprising:
    a diaphragm which restricts a passage of light flux; and
    a light modulation device side lens group which is arranged between the light modulation device and the diaphragm, configured to have different power in a longitudinal direction and a lateral direction of the light modulation device, and configured to include an adjustment optical device capable of advancing and retracting on an optical path,
    wherein the diaphragm restricts the passage of the light flux in different positions in an optical axis direction in association with an operation of advancing and retracting the adjustment optical device of the light modulation device side lens group.

2. The optical projection system according to claim 1,
    wherein, when it is assumed that a distance between the diaphragm and an end surface in a side of the surface to be projected in the light modulation device side lens group is "p", a distance between a focus in the side of the surface to be projected and the end surface in the side of the surface to be projected is FFPx in a lateral section in the light modulation device side lens group, and a distance between the focus in the side of the surface to be projected and the end surface in the side of the surface to be projected in a longitudinal section in the light modulation device side lens group is FFPy,
    wherein, if FFPx<FFPy, the diaphragm is located at a position where p satisfies FFPx<p<FFPy in a state where the adjustment optical device of the light modulation device side lens group is on the optical path, and
    wherein, if FFPy<FFPx, the diaphragm is located at a position where p satisfies FFPy<p<FFPx in a state where the adjustment optical device of the light modulation device side lens group is on the optical path.

3. The optical projection system according to claim 2, wherein the distance p between the diaphragm and the end surface in the side of the surface to be projected in the light modulation device side lens group is substantially equal to a distance FFPL between a focus in the side of the surface to be projected in the light modulation device side lens group and the end surface in the side of the surface to be projected in the state in which the adjustment optical device is withdrawn from the optical path.

4. The optical projection system according to claim 2, wherein, if FFPx<FFPy, in a state where the adjustment optical device of the light modulation device side lens group is on the optical path, FFPx<p≤(FFPy+FFPx)/2, and
    wherein, if FFPy<FFPx, in a state where the adjustment optical device of the light modulation device side lens group is on the optical path, FFPy<p≤(FFPy+FFPx)/2.

5. The optical projection system according to claim 1, in order from the side of the surface to be projected, further comprising:
    a first group which performs enlargement;
    a second group which is the adjustment optical device having different power in the longitudinal direction and the lateral direction of the light modulation device, and capable of advancing and retracting on the optical path; and
    a third group having positive power.

6. The optical projection system according to claim 1, in order from the side of the surface to be projected, further comprising:
    a first group which performs enlargement; and
    a second group which is the adjustment optical device having different power in the longitudinal direction and the lateral direction of the light modulation device, and capable of advancing and retracting on the optical path.

7. The optical projection system according to claim 5, further comprising:
    an advance and retract drive mechanism that makes the second group advance and retract; and
    a diaphragm drive mechanism that makes the diaphragm operate in association with the advance and retract drive mechanism.

8. The optical projection system according to claim 7, wherein the diaphragm drive mechanism makes the diaphragm slide along the optical axis direction in association with the advance and retraction of the second group.

9. The optical projection system according to claim 7, wherein a plurality of the diaphragms are arranged at different positions in the optical axis direction, and the diaphragm drive mechanism changes the diameter of the diaphragm along the advance and retraction of the second group.

10. The optical projection system according to claim 5, wherein, in a section of the light modulation device in a longitudinal direction, in order from the side of the surface to be projected, the second group includes a first optical device group which has positive power and a second optical device group which has negative power.

11. The optical projection system according to claim 5, wherein, in a section of the light modulation device in a lateral direction, in order from the side of the surface to be projected, the second group includes a first optical device group which has negative power and a second optical device group which has positive power.

12. A projector comprising:
    the optical projection system; and
    the light modulation device according to claim 1.

13. A projector comprising:
    the optical projection system; and
    the light modulation device according to claim 2.

14. A projector comprising:
   the optical projection system; and
the light modulation device according to claim 3.
15. A projector comprising:
   the optical projection system; and
the light modulation device according to claim 4.
16. A projector comprising:
   the optical projection system; and
the light modulation device according to claim 5.
17. A projector comprising:
   the optical projection system; and
the light modulation device according to claim 6.
18. A projector comprising:
   the optical projection system; and
the light modulation device according to claim 7.
19. A projector comprising:
   the optical projection system; and
the light modulation device according to claim 8.
20. A projector comprising:
   the optical projection system; and
the light modulation device according to claim 9.

* * * * *